May 23, 1961 R. A. BARBEAU ET AL 2,985,714

PAPER TAPE TRANSMISSION SYSTEM

Filed June 13, 1957 14 Sheets-Sheet 1

FIG. 1. READER-SENDER

INVENTORS
RAYMOND A. BARBEAU,
WILLIAM L. STAHL &
BY PAUL M. YOUNG

Brumbaugh, Free, Graves & Donohue
their ATTORNEYS

INVENTORS
RAYMOND A. BARBEAU,
WILLIAM L. STAHL &
PAUL M. YOUNG
BY Brumbaugh, Free, Graves & Donohue
their ATTORNEYS

FIG. 6. REPEAT UNIT H, FIG. 3

INVENTORS
RAYMOND A. BARBEAU,
WILLIAM L. STAHL &
BY PAUL M. YOUNG
Brumbaugh, Free, Graves & Donohue
their ATTORNEYS May 23, 1961 R. A. BARBEAU ET AL 2,985,714

PAPER TAPE TRANSMISSION SYSTEM

Filed June 13, 1957 14 Sheets-Sheet 4

SEND-RECEIVE CONTROL

C

INVENTORS
RAYMOND A. BARBEAU,
WILLIAM L. STAHL &
PAUL M. YOUNG

BY Brumbaugh, Free, Graves & Donohue
their ATTORNEYS

READER CONTROL D

INVENTORS
RAYMOND A. BARBEAU,
WILLIAM L. STAHL &
BY PAUL M. YOUNG
Brumbaugh, Free, Graves & Donohue
their ATTORNEYS May 23, 1961 R. A. BARBEAU ET AL 2,985,714

PAPER TAPE TRANSMISSION SYSTEM

Filed June 13, 1957 14 Sheets-Sheet 6

INVENTORS
RAYMOND A. BARBEAU,
WILLIAM L. STAHL &
BY PAUL M. YOUNG

Brumbaugh, Free, Graves & Donohue
their ATTORNEYS

May 23, 1961 R. A. BARBEAU ET AL 2,985,714

PAPER TAPE TRANSMISSION SYSTEM

Filed June 13, 1957 14 Sheets-Sheet 7

PUNCH-RECEIVER

INVENTORS
RAYMOND A. BARBEAU,
WILLIAM L. STAHL &
PAUL M. YOUNG
BY Brumbaugh, Free, Graves & Donohue
their ATTORNEYS

PAPER TAPE TRANSMISSION SYSTEM

Filed June 13, 1957 14 Sheets-Sheet 8

INVENTORS
RAYMOND A. BARBEAU,
WILLIAM L. STAHL &
PAUL M. YOUNG
BY Brumbaugh, Free, Graves & Donohue
their ATTORNEYS INVENTORS
RAYMOND A. BARBEAU,
WILLIAM L. STAHL &
BY PAUL M. YOUNG
Brumbaugh, Free, Graves & Donohue
their ATTORNEYS INVENTORS
RAYMOND A. BARBEAU,
WILLIAM L. STAHL &
PAUL M. YOUNG
BY Brumbaugh, Free, Graves & Donohue
their ATTORNEYS

PAPER TAPE TRANSMISSION SYSTEM

Filed June 13, 1957

14 Sheets-Sheet 11

FIG. 12. END OF RECORD F'

INVENTORS
RAYMOND A. BARBEAU,
WILLIAM L. STAHL &
PAUL M. YOUNG
BY Brumbaugh, Free, Graves & Donohue
their ATTORNEYS INVENTORS
RAYMOND A. BARBEAU,
WILLIAM L. STAHL &
PAUL M. YOUNG
BY Brumbaugh, Free, Graves & Donohue
their ATTORNEYS

SAC COUNTER H'

INVENTORS
RAYMOND A. BARBEAU,
WILLIAM L. STAHL &
BY PAUL M. YOUNG
Brumbaugh, Free, Graves & Donohue
their ATTORNEYS

PAPER TAPE TRANSMISSION SYSTEM

Filed June 13, 1957 14 Sheets-Sheet 14

INVENTORS
RAYMOND A. BARBEAU,
WILLIAM L. STAHL &
BY PAUL M. YOUNG
Brumbaugh, Free, Graves & Donohue
their ATTORNEYS United States Patent Office 2,985,714

Patented May 23, 1961

2,985,714

PAPER TAPE TRANSMISSION SYSTEM

Raymond A. Barbeau, Poughkeepsie, William L. Stahl, Fishkill, and Paul M. Young, Pleasant Valley, N.Y., assignors to International Business Machines Corporation, New York, N.Y., a corporation of New York Filed June 13, 1957, Ser. No. 665,532

26 Claims. (Cl. 178—23)

This invention relates to data transmitting systems and, more particularly, to a system for duplicating paper tape bearing coded information at a remote location wherein the accuracy of the duplicated information is checked at the time of preparation.

In the duplication of recorded data at remote locations, it is essential that errors introduced by transmission be eliminated and that the duplicate record be an accurate reproduction of the original. Heretofore, the checking of a duplicated record after transmission in certain systems has required the attendance of an operator at the receiving point to call for retransmission of a message when an error is detected. Further, many of the existing data recording and reproducing systems utilize information codes which must be translated to another code for transmission and then reconverted at the receiving end. Also, in most of the present paper tape systems, no provision is made for correction of an error before an entire tape roll has been transmitted, thus requiring duplication of a corrected message on a different roll of tape. Although the use of data cards rather than tape permits correction after each record has been transmitted or insertion of a corrected card in the proper sequence, such cards limit the message length and prolong the transmission time for groups of messages occupying less than the full capacity of the cards.

Accordingly, it is an object of this invention to provide a data transmission system for duplicating paper tape at a remote location wherein the reproduced tape is automatically checked for accuracy and any errors detected are eliminated without the assistance of an operator.

Another object of the invention is to provide a duplicating system of the above character wherein each reproduced message is checked for accuracy immediately after transmission and, if necessary, retransmitted before the next message is sent.

Still another object of the invention is to provide a duplicating system of the above character wherein a message which continues to be incorrectly reproduced will be automatically retransmitted a predetermined number of times before operator attention is required.

A further object of the invention is to provide a five channel paper tape transmission system wherein no conversion of the information code is required before or after transmission.

It is another object of the invention to provide a data transmission system wherein apparatus failure at either the sending or receiving station is detected as well as errors occurring in transmission.

Yet another object of the invention is to provide a system for duplicating recorded data wherein the apparatus may be placed in a standby condition from either station and, in addition, a signal may be transmitted by either station calling for the use of an alternate method of communication.

It is another object of the invention to provide apparatus for reading a coded tape record and transmitting it without code conversion wherein each message, after completion, may be automatically retransmitted if the message reproduced at the receiving station is inaccurate.

It is still another object of the invention to provide apparatus for receiving coded information and reproducing it on a paper tape record wherein each reproduced message is checked for accuracy and, if inaccurate, is deleted and correctly recorded before the next message is received.

These and other objects of the invention are attained by reading information recorded in parallel on a paper tape column by column and transmitting the bits comprising each character in sequence in a unit time from a reader-sender to a punch-receiver, applying the received message signal to a paper tape punch to reproduce the original tape, meanwhile accumulating a number representative of the total of information bits punched in the reproduced tape and comparing it with the total of bits in the original tape. If the totals agree, a check signal is sent from the punch-receiver to the reader-sender and the reader proceeds to the next message. If, however, the totals are not identical, indicating an error in the reproduced message, the punch-receiver deletes the incorrect portion of the tape and the reader-sender retransmits the message.

Further objects and advantages of the invention will be apparent from a reading of the following description in conjunction with an examination of the accompanying drawings in which:

Fig. 6 is a schematic diagram of a network for controlling the number of retransmissions of a message;

Figure 1:
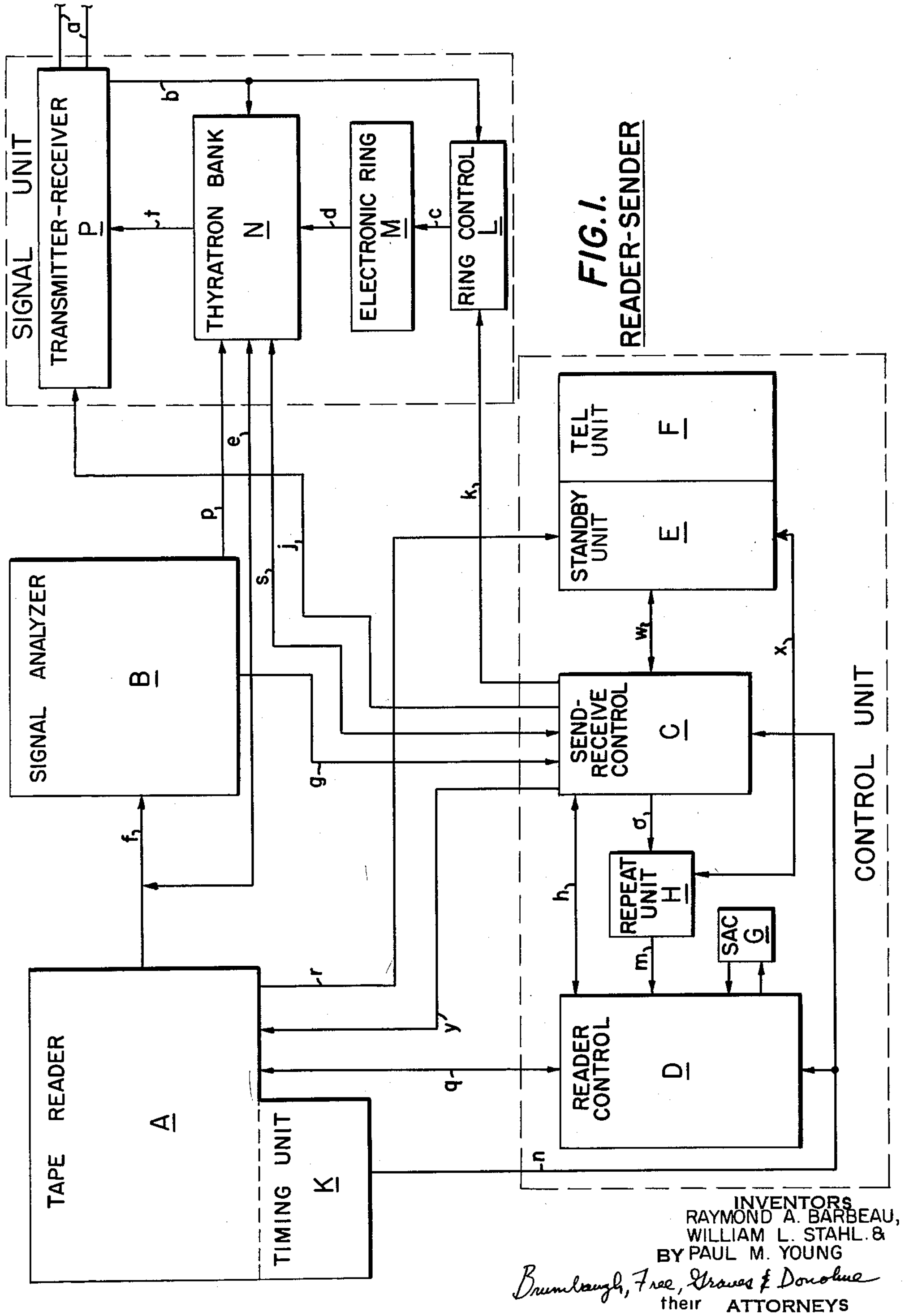
Fig. 1 is a block diagram illustrating schematically a typical reader-sender arranged according to the invention.
Figure 8:
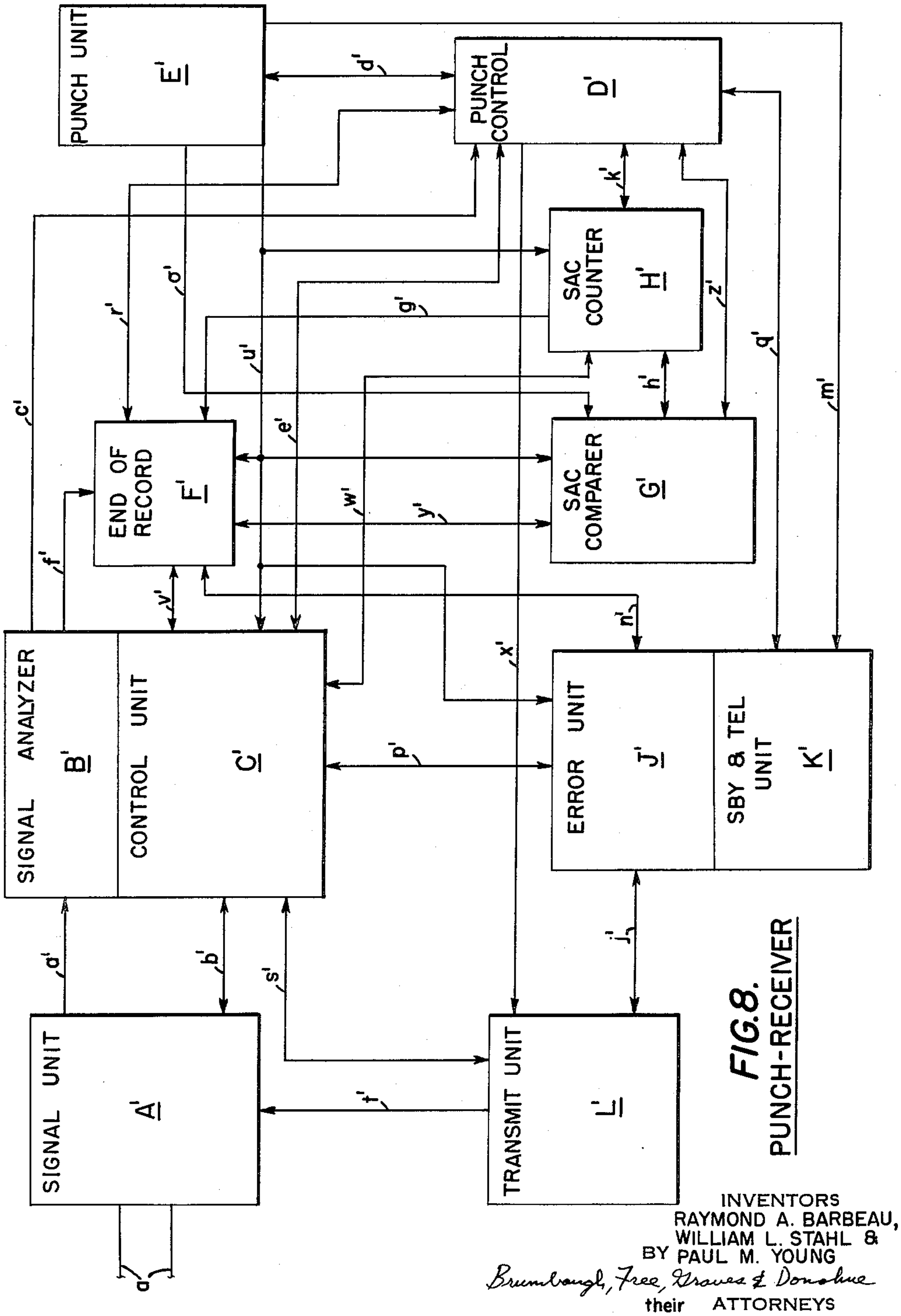
Fig. 8 is a block diagram illustrating schematically a typical punch-receiver arranged according to the invention.

Referring first to reader-sender and punch-receiver block diagrams respectively shown in Figs. 1 and 8 for a general description of the paper tape transmission sys-tme, coded paper tape to be duplicated at a distant location is positioned in a tape reader A of the reader-sender, and a punch unit E′ of the punch-receiver is supplied with unperforated tape. The specific arrangement of the various units of the apparatus mentioned in the general description of the system is to be described in detail later. Power is applied to the reader-sender and the punch-receiver and, after a suitable warm-up delay period, starting circuits are closed in a punch control unit D′ and a send-receive control C. Depression of starting switches in the punch control D′ signals the punch unit E′ through a cable *d′* to punch a notch in the edge of the unperforated tape indicating the start of a message record and also actuates a send relay in a transmit unit L′ through a line *x′*. A circuit completed by this relay operates a signal unit A′ through a cable *t′* causing a series of pulses comprising a check code to be transmitted over signal lines *a* and to a transmitter-receiver P of the reader-sender signal unit.

Inasmuch as the tape transmission system is arranged according to the invention so that control of the system is usually retained at the punch-receiver, switching to the reader-sender only for retransmission of a message incorrectly recorded, the transmitter-receiver P of the reader-sender signal unit is normally in condition to receive signals from the punch-receiver.

Receipt of the check code initiates operation of the reader-sender and the first pulse of the code, being a synchronizing pulse, is applied through a line *b* to a ring control L which in turn signals an electronic ring M through a line *c* to start its operation. The electronic ring M conditions the first grids of a series of thyratrons in a thyratron bank N in a timed sequence through a cable *d* so that signals applied to the second grids will cause them to conduct. Subsequent pulses received from the lines *a* are applied to the second grids of the thyratrons in the bank N in timed relation to the operation of the ring M, corresponding signals from the thyratron plates being applied to a signal analyzer B through cables *e* and *f*. Actuation of appropriate relays within the signal analyzer B actuates the send-receive control C through a cable *g*, conditioning a reader control D through a cable *h*. A signal from the reader control D is in turn applied to the tape reader A by way of a line *q* to start moving a tape record across perforation sensing contacts within the reader.

Figure 2:
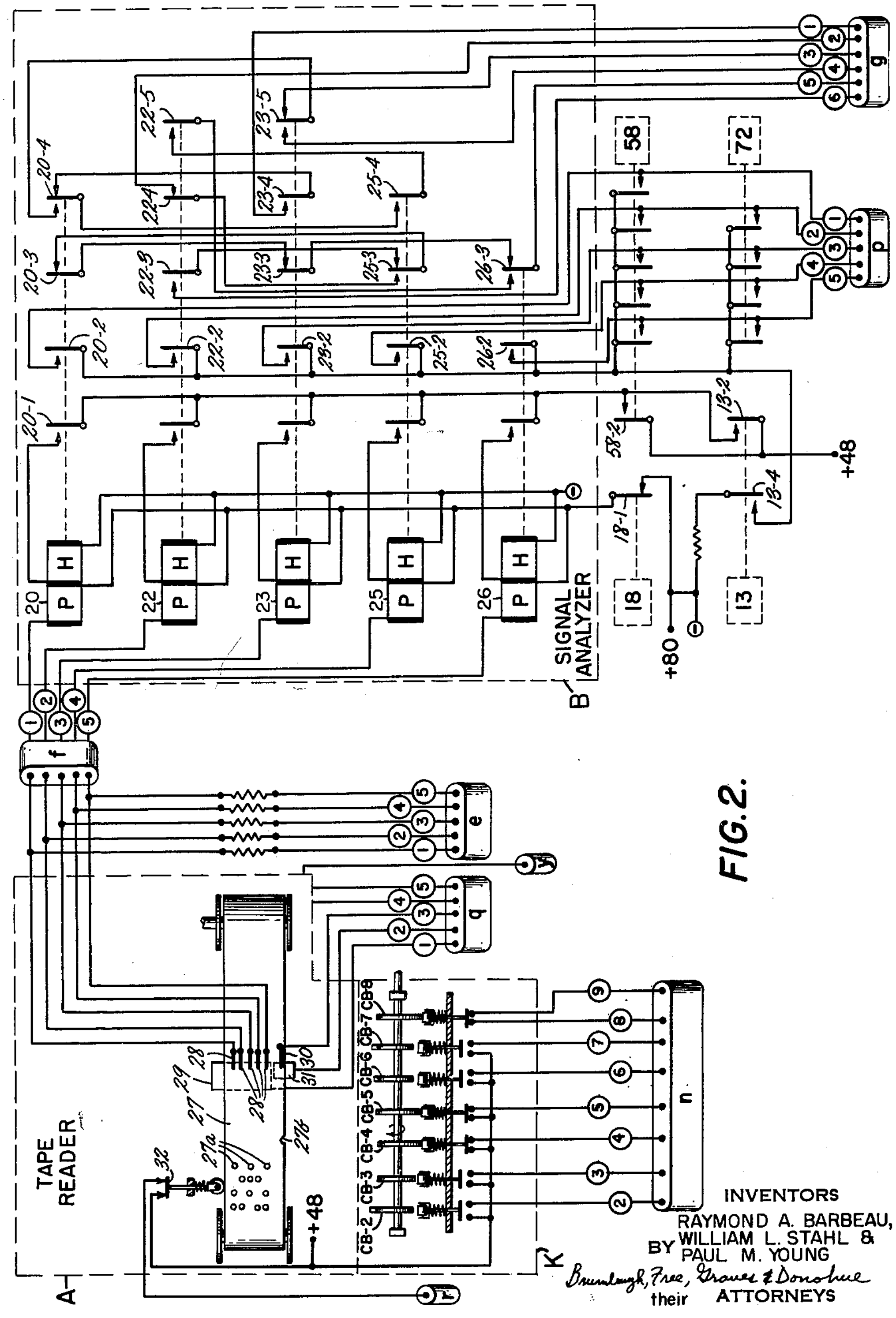
Fig. 2 is a schematic circuit diagram showing apparatus for reading information recorded on paper tape and a code analyzing network.

As illustrated in Fig. 2, a paper tape 27 adapted for use with this embodiment of the invention is of the type described in copending U.S. application Serial No. 553,001, filed December 14, 1955, which has five channels and is adapted to be perforated with successive transverse columns of holes 27*a* each column representing a coded information character. Inasmuch as successive message units or records must be distinguished independently of the information recorded in the five channels during the error deletion operation to be discussed in detail later, an edge notch 27*b* is provided at the start of each record. When this notch is followed by a certain code character, it marks the beginning of a correct message record in the tape, the end of the record being indicated by a series of selected code characters occurring in the proper sequence. Only the data transmitted "in record," that is, from the beginning-of-record code character to the end-of-record code group, inclusive, along with a code number indicating the total of information bits in the record, is duplicated at the punch-receiver.

It will be noted that the number of different character codes available in a five channel system is insufficient to represent all the letters of the alphabet and ten digits along with the required operational codes. Therefore, the codes representing the digits are identical with certain of the letters codes but are preceded by a "letters" (LTRS) or "figures" (FIGS) code to distinguish between the two assignments, only one such distinguishing code being required when shifting to a series of successive letters or figures. In addition, certain of the codes having assigned functions when transmitted in record assume other functions when sent out-of-record. For example, the FIGS code occurring out-of-record marks the beginning of a correct message record as mentioned above. Also, the in-record carriage return code (CR) is transmitted out-of-record by the punch-receiver as a check code to indicate agreement of the information bit totals compared by the system accuracy check (SAC) operation after each message, signalling the reader-sender to proceed to the next message. The in-record line feed code (LF) is utilized out-of-record to indicate a non-check calling for retransmission by the reader-sender while the three codes CR, FS, and LF occurring in that order in-record comprise the end-of-record code group mentioned above.

In the out-of-record condition, the LTRS code becomes the standby (SBY) code and is used by either the reader-sender or the punch-receiver to delay record processing and retain control of the system at the origin of the signal. This code is, in the preferred embodiment of the invention, comprised of perforations in all of the five channels and, being the same pattern produced by deletion of an incorrect message, retains control at the reader-sender when it occurs in the original tape to prevent operation of the punch-receiver while the tape reader passes messages which have been deleted. Another signal, for example, the in-record "V" code when sent out-of-record from either station becomes the TEL code, calling for alternate means of communication and placing both stations in the standby condition.

Returning to the general description of the system, as the tape is advanced through the tape reader A the reader-sender searches for an edge notch followed by the FIGS code indicating the beginning of a message unit. When this combination occurs, the resulting signal is applied to the signal analyzer B through the cable *f*, the send-receive control C is changed to the in-record and "send" conditions through the cable *g* and it, in turn, switches the transmitter-receiver P to the transmit state through a cable *j*. The reader-sender is now in the proper condition to transmit the tape record and transmission is started by actuation of the ring control L through a line *k* from the send-receive control C. This begins the sequential operation of the electronic ring M which, as described above, successively biases the first grids of the series of thyratrons in the thyratron bank N, the second grids of selected thyratrons in the bank having been conditioned through a cable *p* from the signal analyzer according to the tape perforations detected by the reader A. Simultaneous conditioning of both grids in this manner causes the selected thyratrons to conduct, applying a sequential series of timed pulses to the transmitter-receiver P, now in the transmit state, which are sent to the punch-receiver on the lines *a*. When the electronic ring M has completed its cycle of operation, it cuts off the plate current in the thyratrons in the bank N, restoring them to the nonconductive state. Meanwhile, a signal is sent to the tape reader through cables *s* and *y* to read the next code character, the tape having been advanced one column after the end of the last reading operation. Transmission of the message continues in this manner until a CR, FIGS, LF group indicates the end of the message record. After transmitting these codes, the tape is advanced one more position to send the SAC number and then stops to await a check signal from the punch-receiver.

Signals received on the lines *a* by the signal unit A′ of the punch-receiver are applied to a signal analyzer B′ through a cable *a′*, the signal unit having been switched to the receive condition after the transmission of the check code (CR) following the punching of an edge notch in the tape as described above. The punch-receiver would normally ignore signals received out-of-record unless they could be analyzed as an operational code calling for alternate communication (TEL) or standby (SBY) or as a FIGS code indicating the start of a record. A special circuit, however, to be described in detail later, deals with an unanalyzable out-of-record code as though it were the beginning of a record except that it will treat the record as an erroneous one and delete it.

When a code signal following an edge notch is analyzed as a FIGS code by the signal analyzer B′, a control unit C′ actuates the punch control D′ through a cable *c′* causing the code to be punched into the tape by the punch unit E′ through the cable *d′*. All subsequent codes transmitted by the reader-sender are punched into the tape in this manner until the end-of-record code group (CR, FIGS, LF) and the associated SAC number are received. When these are detected by an end-of-record unit F′ through a cable *f′*, the control unit C′ is switched to the out-of-record condition through a cable *v′*, the punch control D′ being signalled through a cable *e′* to record the end-of-record code group and the SAC number and then stop. During the duplication of a message, a SAC counter H′ accumulates a number representing the total number of holes punched into the duplicate tape by the punch unit E′, the number of perforations in each column being transmitted to it over cables *o′* and *h′* from a sensing device in the punch unit. When the sensing device detects the SAC total it is compared with the accumulated total by a signal from the end-of-record unit F′ received on a line *g′*.

If the two totals are in agreement, the transmit unit L′ is conditioned through cables *y′*, *n′* and *j′* to send a check code (CR) to the reader-sender through a cable *t′* and the signal unit A′. Transmission begins when the control unit C′ signals the transmit unit through lines *w′*, *k′* and *x′*.

If a SAC comparer G′ indicates a non-check, an error unit J′ is signalled through the cables *y′* and *n′* and retransmission of the message is called for through the cables *j′* and *t′*. Meanwhile, the punch control D′ is actuated through a cable *q′* to reverse the tape in the punch unit E′ to the beginning of the incorrect message and then move it forward again, meanwhile deleting the incorrect message by perforaitng in all five channels at each position. When the punch-receiver is in condition to receive the same message again another check code is sent to the reader-sender. This method of error deletion is described in detail in U.S. application Serial No. 555,531, filed Dec. 27, 1955, now Patent No. 2,846,007, issued August 5, 1958. The above procedure is repeated until the message is reproduced correctly as determined by comparison of the SAC totals or until a predetermined number of unsuccessful attempts have been made, as counted by a repeat unit H in the reader-sender, after which the system is automatically switched to the standby condition through a cable *x*.

In the following detailed description of the various elements of the system, it is to be understood that each of the connecting cables indicated by a reference character corresponds to the line on Fig. 1 or Fig. 8 having the same reference character and that the conductors within each cable are distinguished at either end by the reference number adjacent the end of the cable. Further, most of the relays are comprised of a pick coil (P) which actuates the relay, a hold coil (H) capable of retaining the relay in the actuated condition after the pick coil is de-energized, and a series of movable contacts and fixed points associated therewith. It is to be noted that in most cases the positive conductor leading to each relay coil is connected to the upper left and the negative or grounded conductor to the lower right of the coil as viewed in the schematic drawings. Also, appropriate spark-suppressing resistor-capacitor combinations may be wired in parallel with those relay coils which are actuated by other relay contacts in the usual manner, thus preventing burning or pitting of the contacts. If desired, direct current power may be supplied to the terminals indicated in the drawings from separate forty volt, forty-eight volt, and eighty volt power supplies (not shown). However, the embodiment described herein is adapted to utilize forty and eighty volt sources in the signal units. As illustrated in Fig. 2, the negative side of the forty-eight volt supply, indicated in the drawings by a minus sign, is connected to the eighty volt positive terminal. In cases where different voltages are utilized in the same circuit, dropping resistors are shown to cause the appropriate voltage reduction. Also, in circuits wherein the current is intended to flow in one direction only, the diode rectifiers illustrated in the drawings are adapted to prevent the flow of current in the wrong direction.

*Reader-sender signal unit*

In order to convert the simultaneous, or parallel, bits of information comprising each code as recorded in each column on the paper tape into sequential or serial information for transmission on the lines *a*, a signal unit, also known as a transceiver, substantially as described in U.S. application, Serial No. 460,662, filed October 6, 1954, is utilized. Connected to the lines *a* is the transmitter-receiver unit P adapted to send or receive signals from a distant station according to the position of an internal relay (not shown), actuated through two conductors *j*–1 and *j*–2 from the send-receive control unit C shown in Fig. 4. The conductors *j*–3 and *j*–4 are joined in the send-receive control when a key trigger relay 13 is energized, causing a receive switch pentode in the signal unit to be reset. Before any operation can be started a time delay mechanism within the signal unit permits all the electrical components to warm up sufficiently after power is applied. At the completion of the warm up period, a signal is sent to the send-receive control C through the conductor *j*–5 to place it in operating condition.

Within the signal unit the ring control L includes a start switch, which may, for example, be a pentode tube adapted to initiate the electronic ring operation upon receipt of a trigger pulse through the line *k* from the send-receive control or *b* from the transmitter-receiver. Operation of the electronic or "Leslie" ring M establishes a time base for the sequential transmission of coded information bits, the ring comprising a series of dual thyratron tubes arranged to operate in the manner described in U.S. application Serial No. 460,662, filed October 6, 1954, and in the "Proceedings of the IRE," August 1948. Ten thyratrons arranged to fire in succession at a predetermined rate may be utilized in the ring, the first providing a synchronizing pulse, the next five transmitting or detecting the code information bits and the last four being arranged to complete operating circuits and to permit a time delay between code transmissions. As each of the ring thyratrons fires, it conditions the first grid of a corresponding thyratron in the bank N, causing it to conduct if the second grid has been similarly conditioned. Actuation of the seventh ring thyratron and the corresponding code thyratron in the bank N completes appropriate circuits in the send-receive control C through the line *s*–2 to cause the signal analyzer B to analyze a received code signal and, if in the transmit condition, a tape advance operation is initiated through the line *s*–3. The last ring thyratron supplies a reset signal at the end of each cycle through the *s*–1 conductor to the send-receive control, the ring being internally stopped thereafter to await another trigger pulse.

The second grids of the code thyratrons are internally connected to the transmitter-receiver through the cable *b* to receive signals from the lines *a* when the signal unit is operating as a receiver, the grids being switched to the signal analyzer B through the cable *p* when the unit is conditioned to transmit. Similarly, the five code thyratron plate electrodes are switched from the cable $e$ to a cable $t$ leading to the transmitter-receiver P when the unit is changed from a receiver to a transmitter. Following the reset pulse, a time delay permits mechanically operated components such as the punch, the circuit breakers in a timing unit K (Figs. 1 and 2), and a reader clutch to maintain synchronism with the electronic ring M.

*Tape reader*

The tape reader A illustrated in Fig. 2 may be one of the type described in U.S. Patent No. 2,637,399 to Doty, and includes a clutch (not shown) to transmit motion from a motor (not shown) to a coded tape 27 to advance it stepwise through a perforation detector, schematically illustrated by the five contacts 28 and the contact plate 29. The contacts are connected to the signal analyzer B through the conductors 1–5 of the cable $f$, respectively, and the conductor $q$–1 provides a voltage signal to the plate 29 when the tape is read. Record-separating notches 27$b$ in the edge of the tape may be detected by a contact 30 and a separate contact plate 31, for example, which cooperate to complete a circuit to the reader control D through the conductors $q$–3 and $q$–2, respectively. Positive voltage is applied through the conductors $q$–5 and $q$–4 to actuate a feed control magnet and a backfeed magnet, respectively (not shown), within the tape reader. In order to prevent operation of the duplicating system when no tape is in position in the reader, a run-out switch 32 is adapted to cut off voltage applied through a line $r$ to a standby unit E (Fig. 1) when the tape 27 runs out.

Figure 3:
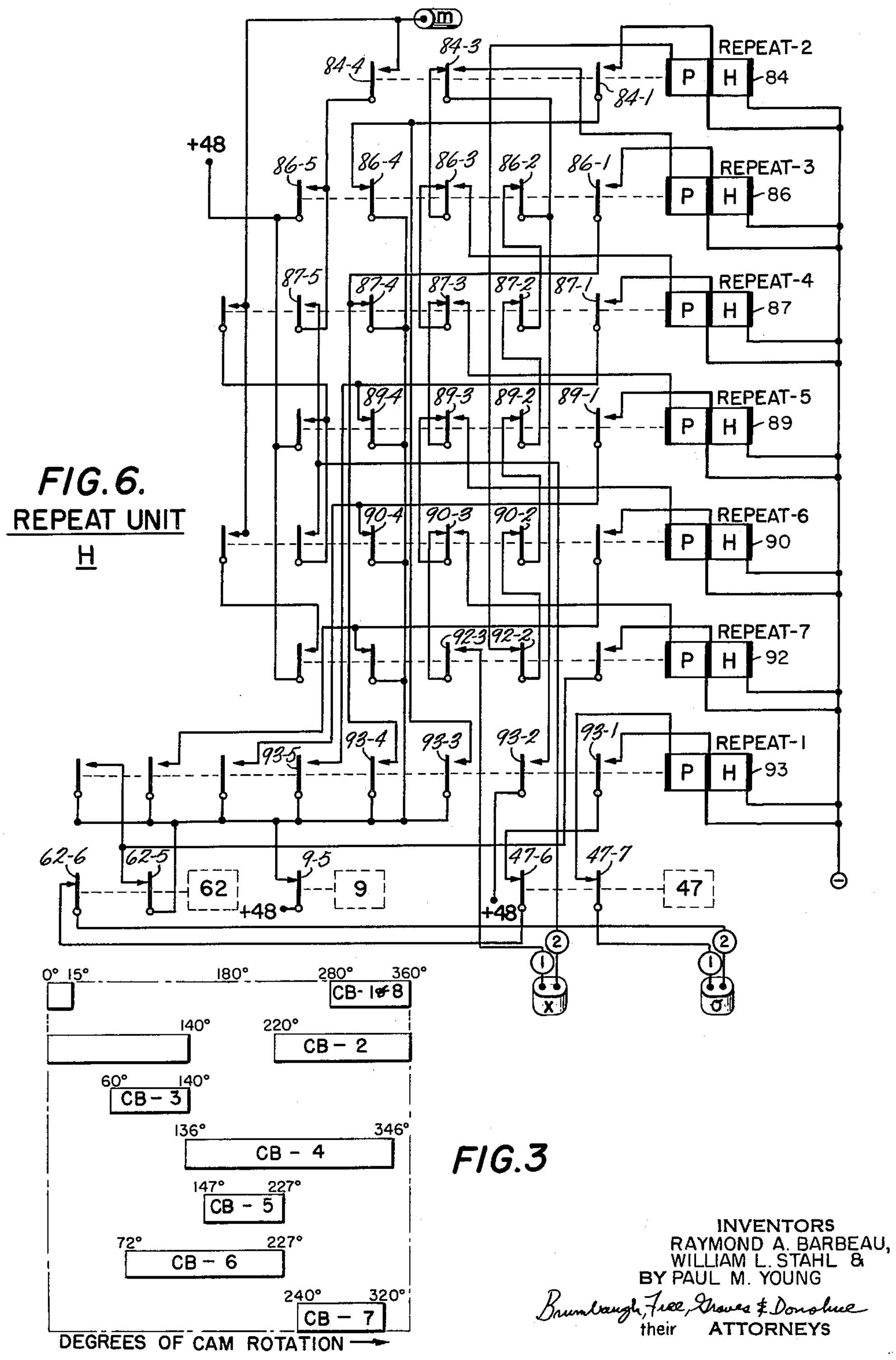
Fig. 3 is a chart illustrating the sequence of actuation of a series of circuit breakers in the reader timing unit.

The timing unit K associated with the tape reader A comprises a series of circuit breakers designated CB–2 through CB–8 actuated by the internal tape drive motor in conjunction with the stepwise motion of the tape 27 through the reader, each circuit breaker completing one cycle during every cycle of the tape motion. As illustrated in Fig. 3, wherein the bars represent the closed portions of each circuit breaker cycle, positive voltage is applied for certain periods during each cycle to each of the conductors $n$–2 through $n$–8 by the correspondingly numbered breakers. Another circuit breaker, CB–1, not illustrated in Fig. 2 but represented in Fig. 3, has the same cycle of operation as CB–8 but is connected between the negative side of the above-mentioned drive clutch and the forty-eight volt negative terminal within the reader A so that the tape 27 may be advanced only during the 280° to 15° portion of the cycle. It will be noted that the breakers CB–2 through CB–7 supply 48 volts positive to the corresponding conductors in the cable $n$ while the CB–8 breaker connects $n$–8 to $n$–9, the latter conductor supplying eighty volts positive except during the thyratron reset portion of the electronic ring cycle. In addition, positive voltage is supplied to the reader clutch from the send-receive control C through the line $y$ when the tape is to be moved to the next position.

*Signal analyzer*

As shown in Fig. 2, the signal analyzer B comprises a group of relays 20, 22, 23, 25 and 26, each wired to one of the tape reader contacts 28 through the cable $f$ and connected to the plate electrodes of the corresponding code thyratrons in the bank N through the cable $e$ if the signal unit is in the receive condition. When a thyratron reset relay 18 (Fig. 4) is de-energized, the normally closed 18–1 contact is restored and an eighty volt potential may be applied through the pick coils of each of these relays to the code thyratron plates to actuate appropriate relays when the reader is receiving information. When the reader is in the transmit condition, these relays are actuated from the reader contacts 28 through the 18–1 contact to the negative terminal.

Once actuated, each relay hold coil retains the relay in the actuated position through one of its own contacts, for example, the hold coil of the relay 20 is energized through the normally open point, now closed, of the contact 20–1, provided either a SBY–3 relay 58 (Fig. 7) or the key trigger relay 13 has completed a circuit to the forty-eight volt positive terminal by closing the normally open contact 58–2 or 13–2, respectively. If the reader-sender is transmitting codes, the tape perforation signals detected by the contacts 28 are also applied to the appropriate conductors in the cable $e$ to the second grids of the code thyratrons. This causes the appropriate thyratrons in the bank N to conduct when the first grids are sequentially actuated by the electronic ring M, sending the desired code signal out on the lines $a$. It is to be noted here that the key trigger relay 13 is actuated only when the reader is in the send condition and that when the unit is in the receive condition the code relays are held by the code thyratrons through the $e$ cable until the thyratrons are reset, the thyratron plates being internally connected to a positive voltage source when in the send condition and being switched to the conductors $e$–1 through $e$–5 to analyze a received signal.

In order to detect the operational codes punched in the tape or received from the punch-receiver, additional contacts form a network which completes appropriate circuits in the send-receive control C through the cable $g$. For example, the FIGS code, indicating the start of a message, is represented by holes in the first, second, fourth and fifth channels of the tape or by actuation of the corresponding code thyratrons and is detected by energization of the relays 20, 22, 25 and 26. This connects the conductors 3 and 5 in the $g$ cable through the contacts 23–5 normally closed, 20–4 normally open, now closed; 25–4 normally open, now closed; 22–5 normally open, now closed; and 26–3 normally open, now closed, leaving the other conductors unconnected. Similarly, the CR code, consisting of a single perforation in the fourth channel, actuates the relay 25 only, connecting the conductors $g$–2 with $g$–5 through the contacts 22–4, normally closed; 25–3 normally open, now closed; 20–3 normally closed; 22–3 normally closed and 26–3 normally closed, the other conductors remaining unconnected. The LF code, which is a single perforation in the second channel, energizes the relay 22 and links the conductors $g$–5 with $g$–6 through the contact 26–3 normally closed, 23–3 normally closed, 20–3 normally closed, 25–3 normally closed, and 22–3 normally open, now closed.

*Send-receive control*

Figure 4:
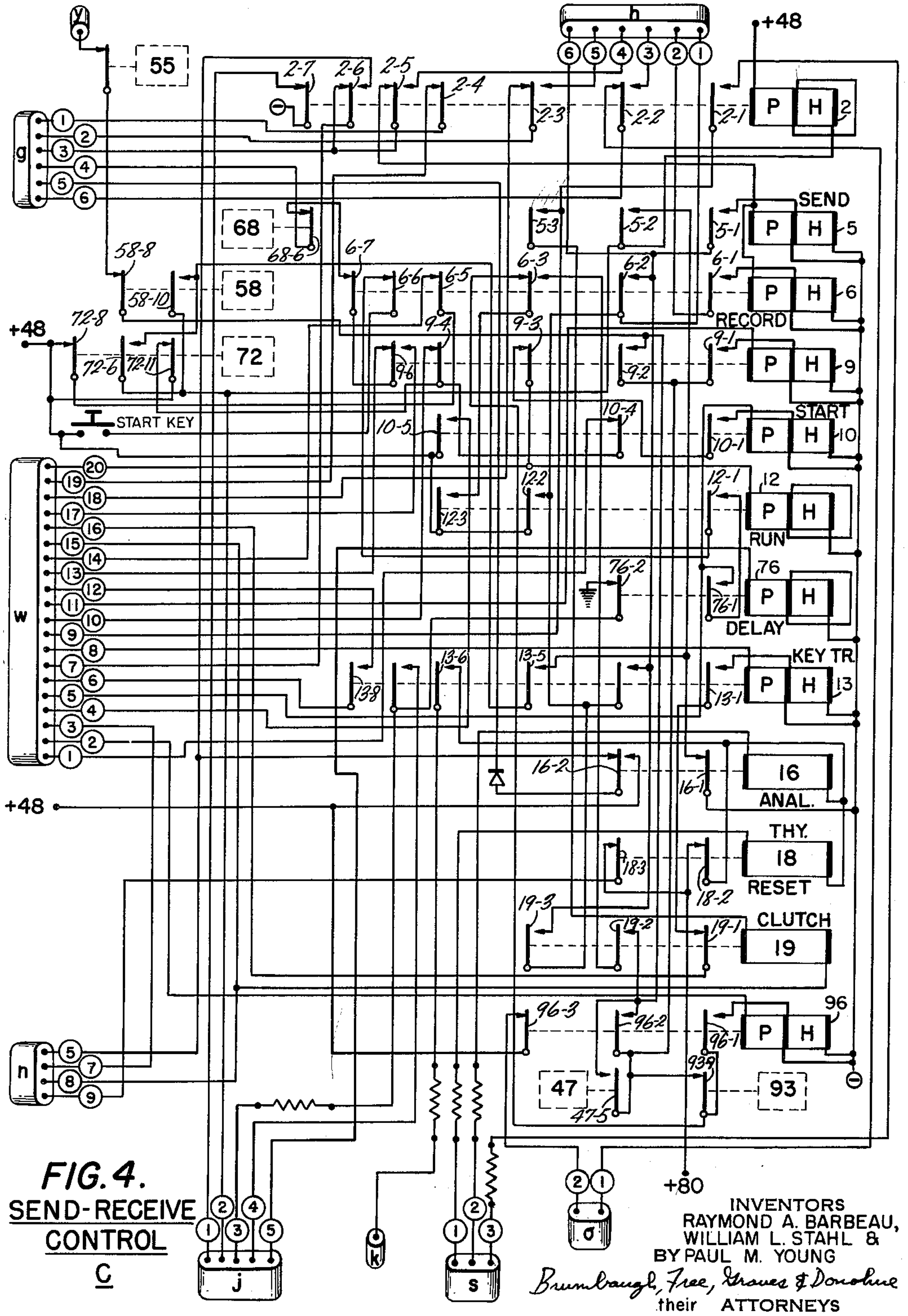
Fig. 4 is a schematic circuit diagram of the send-receive control unit.

After the signal unit warm up period mentioned above, a signal applied through the conductors $j$–5 energizes a delay relay 76 in the send-receive control shown in Fig. 4 and this relay is held in an actuated position thereby until the power is turned off. As long as tape is properly positioned in the reader, a run relay 12 remains energized through the switch 32, the $r$ line, contacts 72–7 and 75–3 in Fig. 7, and conductor $w$–20. Opening of the 76–2 contact permits operation of the signal unit by disconnecting the conductor $j$–3 from ground and when the 76–1 contact is closed, depression of the start key actuates a start relay 10 through the contacts 76–1 and 12–1, now closed, and 6–6, normally closed. Power is applied to the start relay hold coil to retain the relay in the actuated position through the contacts 10–1 now closed and 9–3 normally closed and the conductor $w$–20.

It will be remembered that control of the five channel tape transmission system is normally retained at the punch-receiver and that receipt of a CR code from the punch-receiver conditions the reader-sender to start reading tape. This is accomplished by the circuitry associated with an auto-start relay 9, shown in Fig. 4, an analyze relay 16 being energized by the conductor $s$–2 from the signal unit and the normally closed 18–2 contact.

When the CR code is detected, the conductors $g$–2 and $g$–5 are connected as described above and a circuit is completed from the forty-eight volt positive terminal through the normally open 16–2 contact, now closed, through the lines $g$–5 and $g$–2, contact 2–3 normally closed, and the conductor $w$–18 which leads to the standby unit E and TEL unit F. If the receiver is not in the standby or TEL condition, the conductor $w$–18 is connected to $w$–11, causing the auto-start relay 9 to be energized, the hold coil retaining it in the actuated position through the contacts 9–1 now closed, 93–9 normally closed, 6–3 normally closed and 12–3 normally open, now closed. Closing of the contact 9–2 actuates the reader clutch through the line $y$, the SBY relays 55 and 58 being unenergized, to advance the tape to the next code column when the circuit breaker CB–1 closes at 280° of the cycle shown in Fig. 3. Meanwhile, the signal unit, which picked the analyze relay 16 through $s$–2 after receipt of the CR code, has reached the final electronic ring position and sends a pulse through the conductor $s$–1 to actuate the thyratron reset relay 18 momentarily, shutting off the thyratrons in the bank N and restoring the code relay 25 through the contact 18–1 (Fig. 2), meanwhile resetting the analyze relay 16, the key trigger relay 13 being unenergized.

As the tape moves through the reader, it searches for an FIGS code indicating the beginning of a record. When detected this code links the conductors $g$–3 and $g$–5 as described above, the relays 20, 22, 25 and 26 being actuated through the contacts 28, the plate 29 (Fig. 2), the conductor q–1, the contact 47–2 normally closed, and the conductor $n$–6 (Fig. 5) when CB–6 closes at 72°. This energizes a send relay 5 and record relay 6 through normally open contact 16–2, now closed, the conductors $g$–5 and $g$–3, and the contact 2–5, normally closed, which puts the reader-sender in record. Also, the key trigger relay 13 is picked through the normally closed contact 2–6 and conductors $w$–7 and $w$–8 of a cable $w$ (Fig. 1). Linking of those conductors by the contact 58–12 as shown in Fig. 7, triggers the electronic ring through the contacts 18–2, 13–6 and the line $k$.

Figure 5:
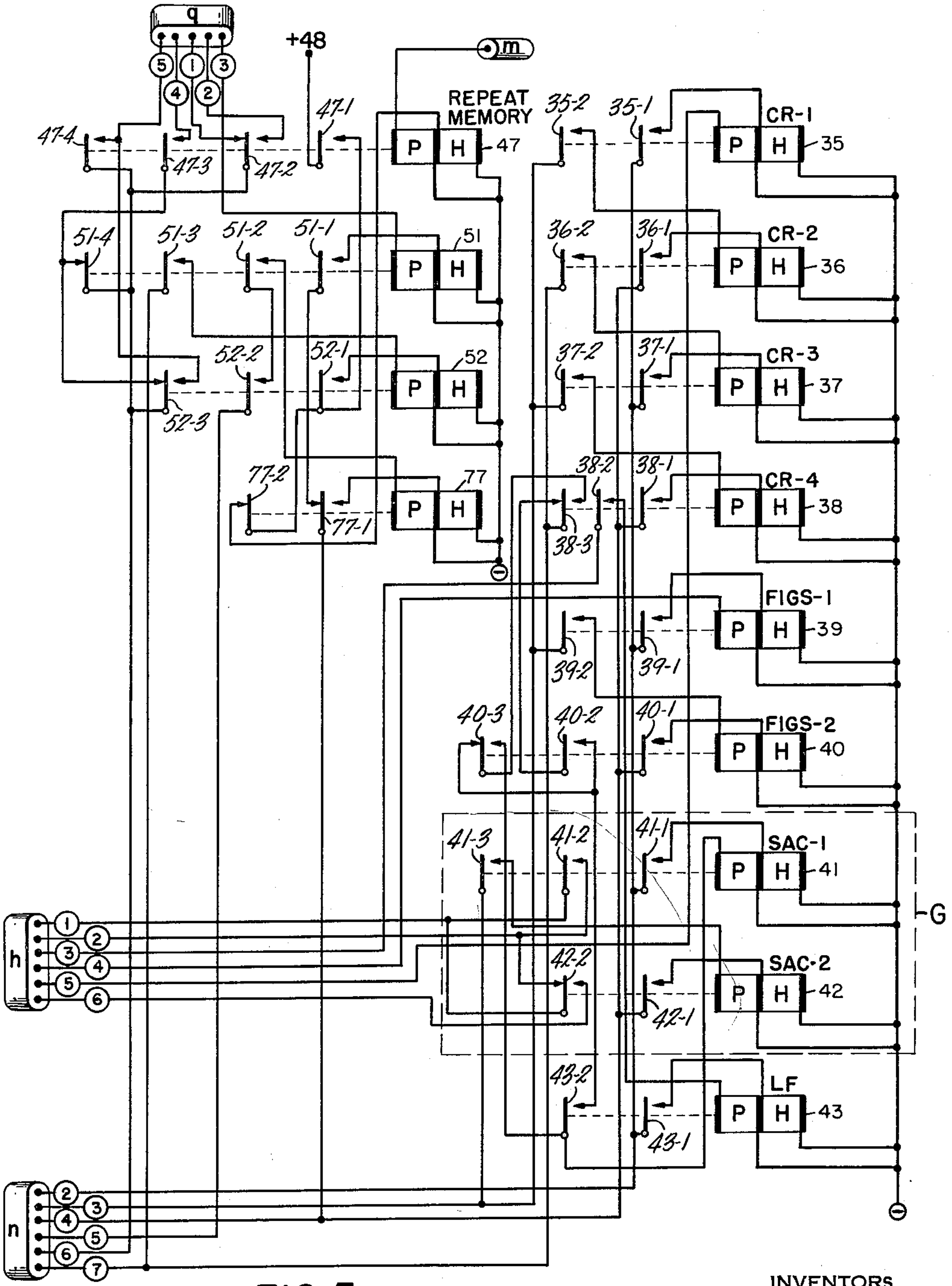
Fig. 5 is a schematic diagram of the reader control unit including an accuracy check detection circuit.

Actuation of the send relay 5 connects the negative side of a relay 2 to the negative terminal through the normally open contact 5–2, now closed, and the contact 16–1 normally closed. This arrangement assures that the send relay 5 is picked through the contact 2–5 before that contact transfers, the hold coil being energized thereafter through the contacts 5–1, 6–2 and 12–2, normally open, now closed, until the end of the record. The record relay 6 is similarly held through the contacts 6–1 and 12–2, the $h$–1 and $h$–2 conductors being linked through normally closed contact 42–2 of relay 42, as shown in Fig. 5. Transfer of the contacts 2–6 and 2–7 switches the transmitter-receiver P to the transmit condition through the conductors $j$–1 and $j$–2, while closing of the 2–1 contact permits receipt of clutch actuation pulses from the signal unit through the conductor $s$–3.

At this time the auto-start relay 9 is restored to the normal position by transfer of the contact 6–3, breaking the auto-start circuit to the reader clutch and placing it under the control of clutch relay 19 through the normally open contacts 5–3 and 2–1 and the conductor $s$–3. Connection of $n$–8 and $n$–9 by the circuit breaker CB–8 at 280° completes the clutch relay circuit from the eighty volt terminal through the contact 18–3. When the clutch relay is actuated, power is available from the forty-eight volt terminal through the contacts 12–3, 6–3 and 19–2 to the line $y$, energizing the reader clutch to move the tape one position, the clutch magnet circuit being internally completed through the circuit breaker CB–1.

Figure 7:
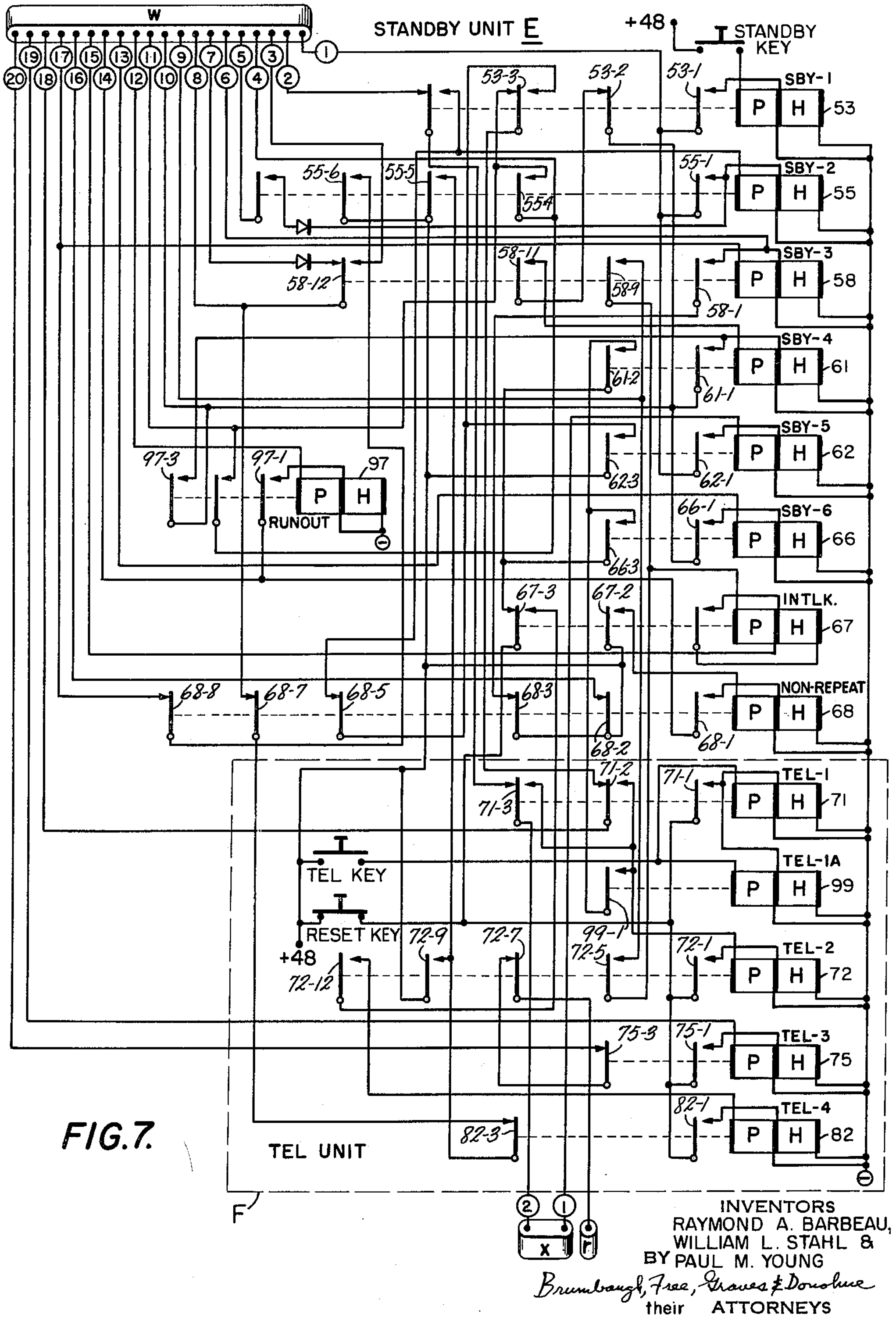
Fig. 7 is a schematic circuit diagram of circuits for placing the reader-sender in a standby condition.

It will be noted that the appropriate code relays 20, 22, 23, 25 and 26 are held through the contact 13–2 (Fig. 2) and that the key trigger relay is held through the contacts 13–1, 19–1, the conductor $w$–16 and contact 68–2 in Fig. 7 until the clutch relay is actuated, being re-energized through the line $n$–5 and the contact 2–6 normally open at 147° during every circuit breaker cycle to begin the electronic ring operation. In this manner, the reader-sender progresses stepwise through the code columns comprising the message, transmitting each code and awaiting the end-of-record code (CR, FIGS, LF).

When the end-of-record code group is detected by the signal analyzer and the reader control D as described below, it is transmitted in the same manner along with the SAC number recorded immediately after it on the tape. Meanwhile, the send relay 5 is held during transmission of the CR, FIGS, LF code group through the contacts 5–1, 42–2 normally open, the conductors $h$–1 and $h$–6 and the normally open contact 12–2, until after the SAC–2 relay 42 (Fig. 5) is restored, permitting the SAC code total to be transmitted to the punch-receiver. When the record relay 6 is restored by the transfer of the 42–2 contact, reader clutch operation through the normally open contact 6–3 is prevented, but the clutch relay 19 is still actuated, dropping out the key trigger relay 13 which was held through the contact 19–1. This in turn restores the code relays by opening of the contact 13–2 in Fig. 2, the code thyratrons being internally reset at the end of the electronic ring cycle.

It will be noted that the send relay 5 is held after the contacts 6–2 and 42–2 have opened through the normally open contacts 5–1, 19–3 and 12–2, now closed, until the clutch relay 19 is de-energized, opening the 19–3 contact. This assures continued operation of the signal unit as a transmitter until the thyratron reset relay 18 has been actuated through the line $s$–1 at the end of the electronic ring cycle. Transfer of the 5–2 contact then disconnects the ground side of the relay 2, opening the 2–6 and 2–7 contacts to restore the transmiter-receiver P to the receive condition and blocking further clutch actuation pulses from the conductor $s$–3.

As described above, receipt of an LF code out-of-record indicates a non-check of the SAC numbers compared at the punch-receiver. This applies a forty-eight volt positive signal through the normally open contact 16–2, the conductors $g$–6 and $g$–5, the normally closed contact 2–2, conductor $o$–1 in a cable $o$ (Fig. 1), and contact 47–7 of relay 47 (Fig. 5) to relay 93 in the repeat unit (Fig. 6) to initiate retransmission of the message as described below.

*Reader control*

As shown in Fig. 5, the reader control D comprises a network adapted to respond to certain functional codes and operate the tape reader accordingly. When the first FIGS code is detected at the beginning of a message record, no signal is transmitted to reader control FIGS relays 39 and 40 because the relay 2 has not been actuated. Therefore, the reader control is now in condition to receive the CR, FIGS, and LF codes in the proper order. Any two of these codes appearing in the proper sequence are sufficient to indicate the end of the record to the reader control.

When the tape reader senses the CR code, connecting the conductors $g$–2 and $g$–5 as described above, CR–1 relay 35 is picked through the conductor $h$–5 and the contact 2–3 normally open, now closed, as shown in Fig. 4 (it will be remembered that the relays 2, 5, 6 and 12 remain energized throughout transmission of the message record). The relay 35 is held through the contact 35–1 and conductor $n$–2, carrying the relay hold over into the next reading cycle, CR–2 relay 36 being actuated through the contact 35–2 and conductor $n$–3 at 60° and held through the contact 36–1 and line $n$–4 to 346°. Meanwhile CR–3 relay 37 is energized through the contact 36–2 and line $n$–7 at 240°, its hold coil retaining it through the 37–1 contact and conductor $n$–2 to 140° of the second cycle after the CR code is sensed. CR–4 relay 38, being energized through the contact 37–2 and line $n$–3 and held through the contact 38–1 and conductor $n$–4, carries the CR signal to 346° of the second cycle.

During the cycle following CR detection, the FIGS code is sensed through the line $h$–4 and contact 2–5 normally open, the $g$–3 and $g$–5 conductors being linked in the analyzer, picking the FIGS–1 relay 39 which is held through the contact 39–1 and line $n$–2 and which picks the FIGS–2 relay 40 through the contact 39–2 and conductor $n$–3 at 60° of the following cycle. When the conductors $g$–5 and $g$–6 are connected by detection of the LF code in the second cycle following the CR code, LF relay 43 is actuated through the normally open contact 38–2, now closed, the $h$–3 conductor, and the normally open contact 2–2 (Fig. 4). This relay is held into the next cycle by the conductor $n$–2 through the contact 43–1, SAC–1 relay 41 being picked meanwhile through the contacts 40–3 and 38–3 normally open and the conductor $n$–7, and held through the contact 41–1 and line $n$–2. It will be observed that this occurs even if the LF relay 43 was not actuated. Moreover, a circuit is available through the contact 38–3 normally closed, 40–2 normally open and 43–2 normally open to pick the SAC–1 relay 41 even though no CR code was detected. Actuation of the SAC–2 relay 42 takes place through the contact 41–3 and line $n$–3 and it is held by the contact 42–1 and conductor $n$–4, the record relay 6 hold being taken over by the contact 41–2 from 42–2 until the relay 41 is restored, de-energizing the record relay 6 to switch the reader-sender to the out-of-record condition, the tape motion being stopped by transfer of the 6–3 contact as described above.

Repeat operation of the tape reader after the receipt of a non-check code from the punch-receiver is controlled by the sensing of the edge notches 27$b$ (Fig. 2) in the tape by relay 51 in the reader control D (Fig. 5). After the transmission of a record, the tape stops with the record-separating notch previously mentioned under the notch read contact 30, thereby connecting the conductors $q$–2 and $q$–3. When repeat transmission is called for a signal from line $m$ actuates the repeat memory relay 47, transferring the 47–2 contact to apply the circuit breaker CB–6 voltage from $n$–6 through the conductors $q$–2 and $q$–3 to pick the relay 51. Meanwhile the 47–4 contact connects the line $n$–6 to the reader feed control magnet (not shown) which prevents the forward feed pawl from operating through $q$–5, the backfeed magnet (not shown) being actuated at the same time through contact 52–3 of relay 52 or contact 51–4 normally closed, 47–3, and the line $q$–4. After termination of the repeat pulse, the repeat memory relay 47 is held until the end of the repeat cycle through contacts 47–1 and 77–2, and the 47–5 contact in Fig. 4 actuates the reader clutch (not shown) through the line $y$, the contacts 6–3 and 12–3 normally open after the 93–9 contact is restored as described below. Thus, the tape is stepped backward in the reader to the beginning of the message according to the circuit breaker CB–6 voltage pulses applied to the backfeed magnet.

Sensing of the edge notch at the end of the record before the backfeed starts actuates the notch read relay 51 (Fig. 5) through the line $q$–3, closing the contact 51–3 to energize the notch memory relay 52. This relay is held through the contacts 52–1 and 47–1 until the end of the repeat cycle, the notch relay 51 being held through the contacts 51–1 and 77–1 and the line $n$–4 for the duration of the circuit breaker CB–4 cycle. Detection of the notch at the beginning of the message which is to be repeated actuates the notch read relay 51 again, this time energizing the backfeed end relay 77 through the contacts 51–2 and 52–2 normally open and the line $n$–5 and breaking the circuit to the backfeed magnet through the contact 51–4, also opening the 77–2 contact to drop the relay 47. This terminates the backfeed motion, leaving the beginning-of-record notch under the notch read contact 30 and restores the relays 51, 52 and 77.

*Repeat unit*

As mentioned previously, the reader-sender can be adapted to retransmit a message automatically any predetermined number of times after the receipt of successive non-check signals from the punch-receiver. The network illustrated in Fig. 6 is arranged to provide three successive repeat transmissions and then switch the system to the standby condition if no check code is received.

More particularly, receipt of the non-check code actuates the repeat–1 relay 93 through the contact 47–7 as described above, the hold coil being energized through the contacts 93–1, 47–6, 62–6, the conductor $o$–2 and contact 96–3 of relay 96 (Fig. 4) from the forty-eight volt positive terminal. Transfer of the 93–2 contact picks repeat–2 relay 84 through contacts 86–2, 87–2, 89–2, 90–2 and 92–2, the relay 84 being held through contacts 84–1, 86–4 and 9–5, or through contacts 84–1, 93–3, and 9–5 when the 86–4 contact is opened by actuation of relay 86 through contacts 84–3 and 93–2. The circuit completed by the contact 93–4 holds the repeat–3 relay 86 through the contacts 86–1, 93–4 and 9–5, or through the 86–1, 87–4 and 9–5 contacts when the relay 93 is restored. When the relays 84 and 86 are both energized the repeat memory relay 47 (Fig. 5) is picked through the contacts 86–5, 84–4 and the line $m$ to start the backfeed operation described above, thereby opening the contacts 47–6 and 47–7 and restoring the relay 93, the relay 84 being de-energized by opening of the 93–3 contact.

When the punch unit E′ has deleted the first erroneous record and advanced its tape to a new position, another non-check signal is transmitted which again picks the relay 93 (Fig. 6) in the manner described above. Transfer of the 93–2 contact picks repeat–4 relay 87 through the normally closed contact 84–3 and the normally open contact 86–3, the 87 hold coil being energized through the contacts 87–1 and 89–4. This completes a circuit through the contacts 86–5, 87–5, and the conductors $x$–2 and $w$–2, which are connected in the standby unit as shown in Fig. 7, to actuate the restart relay 96 in the send-receive control shown in Fig. 4. Retransmission is started by the operation of the reader clutch through the contacts 12–3 normally open, 6–3 normally closed, 93–9 and 96–2 and the line $y$. The restart relay holds through the contacts 96–1, 6–3, and 12–3 until the reader-sender is in record, the repeat–1 relay 93 having been restored through the conductor $o$–2 by the transfer of the contact 96–3. Meanwhile, in the repeat unit, relay 89 has been actuated through the contacts 87–3 normally open, 86–3 and 84–3 normally closed, and 93–2 normally open before the relay 93 was restored, and the relay 89 hold coil remains energized through the contacts 89–1 and 90–4 after the relay 93 is restored, returning the relay 87 to the normal position by the opening of the contact 93–5.

Further non-check signals in succession actuate repeat relays 90 and 92 in the same manner and, following the third unsuccessful transmission, the non-check signal transfers the contact 93–2 to complete a circuit through the contacts 84–3, 86–3, 87–3, 89–3, 90–3, 92–3 and the conductor $x$–1 to pick SBY–5 relay 62 in the standby unit shown in Fig. 7. This opens the 62–5 and 62–6 contacts in Fig. 6, preventing any further transmissions of the message, stopping the tape in the reader at the beginning of the unduplicated message and signalling the reader operator by a light or buzzer (not shown). The operator, after examining the tape in the reader, may initiate another series of retransmissions by depressing the start key, thereby energizing the start relay 10 through contacts 6–6, 12–1 and 76–1, and dropping the relay 62 which is held through contacts 72–11, 10–4, the line $w$–1 and the contact 62–1.

If the message has been successfully duplicated during any of these retransmissions, the check code CR, transmitted by the punch-receiver, will actuate the auto-start relay 9 through the normally open contact 16–2, the conductors $g$–5 and $g$–2 linked in the analyzer as described above, the normally closed contact 2–3, and the conductors $w$–18 and $w$–11 which are connected in the standby unit.

*Standby and TEL units*

In order to avoid unnecessary operator attention at both stations when transmission is temporarily halted, either station may be placed in a standby condition awaiting an automatic or manual operation at the other station. As mentioned above, the standby signal (SBY) is the out-of-record LTRS code comprised of perforations in all five tape channels or pulses at all five of the electronic ring code positions. This signal may be transmitted at any time from either station, for example, by manual depression of the standby key, automatically from the reader-sender when successive attempts to send a record have failed, or automatically from the punch-receiver when the tape supply runs low. However, since the SBY signal cannot be transmitted while the system is in record, a memory is set up if a message is being sent and the SBY code is transmitted at the end of the message.

When it is desired to communicate with the other station by a different means, for example, by telephone, a TEL signal is transmitted by depression of the TEL key. Since this signal is the "V" code out-of-record, it likewise cannot be sent during a message transmission, but is automatically delayed until the end of the message.

The standby and TEL networks for the reader-sender are illustrated in Fig. 7 wherein it will be seen that depression of the standby key energizes SBY–1 relay 53, the hold coil retaining it through the contact 53–1, the conductor *w*–1, contacts 10–4, and 72–11 in Fig. 4, setting up a memory that the key has been operated. Receipt of a check code from the punch, indicating it is out-of-record, energizes SBY–2 relay 55 through contacts 68–5, 53–3 normally open, 71–2 normally closed, the conductor *w*–18, the contact 2–3 normally closed (Fig. 4), the conductors *g*–2 and *g*–5 which are linked by the receipt of the CR code, and the normally open contact 16–2 when the analyze relay 16 is energized. The relay 55 is held through the contact 55–1, the line *w*–1 and the contact 10–4, and closing of the 55–6 contact applies positive voltage through contact 68–8 to actuate the SBY–3 relay 58, its hold coil being energized through contacts 58–1 and 68–3.

It will be observed in Fig. 2 that operation of the relay 58 closes a series of contacts to apply grid potential to all the code thyratrons in the bank N through the cable *p*, the 13–4 contact being closed by the actuation of the key trigger relay 13 (Fig. 4) through contacts 55–5, 82–3, 68–7 and the conductor *w*–8 (Fig. 7). Transmission of the SBY signal begins when the contacts 58–10 and 13–5 in Fig. 4 close, connecting the relay 2 to negative through the contact 16–1, thereby transferring the contacts 2–6 and 2–7 to switch the signal unit to the transmit condition through *j*–1 and *j*–2. Inasmuch as the SBY code is to be transmitted once only, the clutch actuation signal from the signal unit received through *s*–3 is applied to interlock relay 67 through the contact 2–1, the line *w*–9 and the contact 58–9, the positive potential being received through the conductors *w*–15 and *n*–8. Transfer of the 67–2 contact picks nonrepeat relay 68 which is held through the contact 68–1, the conductor *w*–14, contacts 6–5 and 72–8 in Fig. 4 until released by depression of the start or TEL key. The nonrepeat relay 68 also restores the SBY–3 relay 58 by opening the contact 68–3, thereby removing the thyratron grid potential applied to the series of 58 contacts shown in Fig. 2 and releasing the relay 2 which was held through the contact 58–10 in Fig. 4. This converts the signal unit to the receive condition, the key trigger relay 13 being restored by opening of the 68–7 contact.

In order to eliminate the SBY condition the start key is depressed, actuating the start relay 10 through the contacts 6–6, 76–1, and 12–1, energization of the relay 55 hold coil being maintained after the contact 10–4 breaks through the line *w*–5 until the start key is released, thus permitting the auto-start relay 9 to be picked through the contact 10–5, the line *w*–4, the contact 55–4 and the conductor *w*–11. Sensing of the initial FIGS code in the next message picks the record relay in the manner described above and drops the non-repeat relay 68 through the conductor *w*–14 by opening the contacts 6–5.

Another condition which automatically establishes the standby state at the reader is the sensing of an out-of-record LTRS code as, for example, in a deleted portion of the original tape. Remembering that detection of this code connects the conductors *g*–4 and *g*–5, it will be noted that a circuit is completed from the line *n*–5 through the normally closed contact 16–2, the conductors *g*–5, *g*–4, the contacts 68–6, 6–7, 9–6 normally open, and the line *w*–17 to pick the SBY–3 relay 58. When the circuit breaker CB–7 applies power to the line *n*–7 in the same cycle, the key trigger relay 13 is picked through the line *w*–8, the contact 58–12 normally open, and the conductor *w*–3 causing the standby code to be transmitted. The interlock relay 67 and the non-repeat relay 68 block further transmission as described above while the reader advances additional LTRS codes, the reader clutch being inactivated by opening of the 58–8 contact in Fig. 4, thus permitting the tape to be advanced at maximum speed. When the FIGS code is detected, both stations go into record and the standby state is eliminated as described above.

Run-out of tape in the reader likewise puts both stations into the standby condition in a similar manner, the trailing end of the original tape being punched with LTRS codes. This time, however, when the run-out switch 32 (Fig. 2) in the reader opens, it breaks the circuit to the run relay 12 through the conductor *w*–20, dropping the auto-start relay 9 and the reader clutch which were held through the contact 12–3. Meanwhile, run-out relay 97 is picked through the contacts 68–3, 58–1, the line *w*–6, the contact 13–8 and the conductor *w*–12 and is held through the contacts 72–8, 6–5, the line *w*–14, and the contact 97–1 to signal the operator by a buzzer (not shown), and SBY–4 relay 61 is picked through the contacts 58–11, 53–2, the line *w*–10, the contacts 9–4 and 72–11 and held through the contacts 61–1 or 97–3 to turn on a SBY indicator light (not shown).

As previously mentioned, repeated unsuccessful transmissions of a message pick the SBY–5 relay 62 which is held through the contact 62–1, the line *w*–1 and the contact 10–4. In this case, transfer of the 62–3 contact picks the SBY–2 relay 55 through the contact 68–5 causing transmission of the SBY code in the manner described above.

Receipt of a TEL code, which can be transmitted only when the system is out-of-record, energizes the code relays 22, 23, 25 and 26, connecting the conductors *g*–1 and *g*–5 in Fig. 2. When the analyze relay 16 (Fig. 4) is pulsed by the signal unit, a circuit is completed through the contact 16–2 normally open, the conductors *g*–5 and *g*–1, the contact 2–4 and the line *w*–19 to pick TEL–3 relay 75 (Fig. 7), the hold coil being maintained through the contact 75–1 and a reset key. The run relay 12, which was held through the contact 75–3 and the line *w*–20 is thereby dropped and this action may be utilized to operate a buzzer and signal light (not shown) and to switch a telephone handset, for example (not shown), to the lines *a*. Actuation of the reset key drops all the TEL relay hold coils to return the system to normal after the alternate communication is completed.

Depression of the TEL key while the reader-sender is in-record actuates TEL–1 and TEL–1A relays 71 and 99, both relays being held through the reset key and the contact 71–1, but the TEL code is not transmitted until the system goes out-of-record. This occurs on receipt of a check code or the second non-check code during error deletion after the tape has been backed up in the punch, causing TEL–2 relay 72 to be picked through the contact 71–3 and the line *x*–2 from the repeat unit. As shown in Fig. 2, operation of the TEL–2 relay 72 conditions the appropriate thyratron grids for transmission of the TEL code through the lines *p*–2, *p*–3, *p*–4 and *p*–5, the 13–4 contact being closed by actuation of the relay 13 through the contacts 72–9, 82–3, 68–7 and the conductor *w*–8. Transmission of the code starts when the pick coil of the relay 2 is connected to negative through the contacts 16–1, 13–5 and 72–6 in Fig. 4, the interlock and non-repeat relays 67 and 68 being actuated through the contact 72–5 and the circuit previously described to prevent more than one transmission. Operation of TEL–4 relay 82 takes place when the contact 72–12 closes and transfer of the 82–3 contact prevents further key trigger operation until the reset key is opened. If the system is in the standby state, the TEL signal may be transmitted immediately, the TEL–2 relay 72 being picked through the contacts 99–1, 61–2 or 66–3, and 67–3.

*Punch-receiver signal unit*

Figures 9, 17:
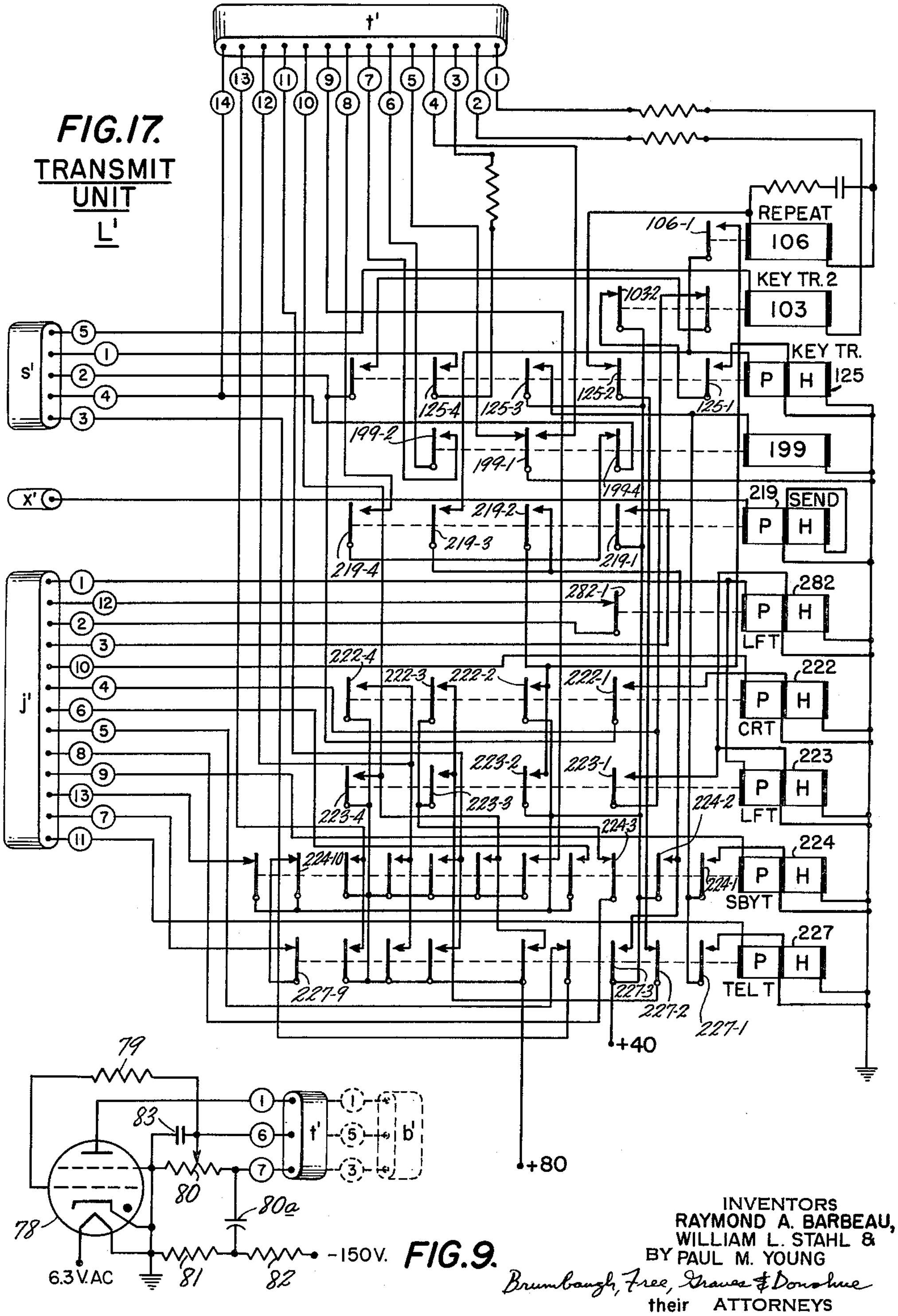
Fig. 9 is a schematic diagram of a timing circuit utilized in the punch-receiver signal unit to time the repeat and the non-sequence operations.
Fig. 17 is a schematic diagram of a transmit unit network.

The signal unit A′ utilized in the punch-receiver is the same as the reader-sender signal unit A, but in addition includes two electronic timing units such as the one illustrated in Fig. 9, for example. Each of the timing units comprises a thyratron tube 78 having its cathode and second grid grounded, the first grid being connected through a 1,000 ohm resistor 79 to the sliding contact of a one megohm potentiometer 80. One end of the potentiometer is grounded and a negative potential is applied to the other end through an adjustable capacitor 80*a* from the junction of a voltage divider consisting of a 30,000 ohm resistor 81 and a 150,000 ohm resistor 82, the latter being connected to a negative 150 volt terminal while the potentiometer slider is connected through a ten microfarad capacitor 83 to ground.

One of the timers in the signal unit is utilized in a repeat circuit adapted to retransmit certain operational codes to the reader-sender when no response has been received after a predetermined time following the first transmission. In this case, the thyratron plate electrode is connected to the *t*′–1 conductor while the slider and negative terminals of the potentiometer 80 are connected to the *t*′–6 and *t*′–7 conductors respectively, the slider position determining the time of delay before retransmission. The other timer is arranged to control a non-sequence circuit adapted to call for repetition of a message when a predetermined period of time longer than normal interval between code signals elapses and no signal is received from the reader-sender. In order to accomplish this the thyratron plate electrode of the non-sequence timer is connected to the *b*′–1 conductor, while the potentiometer slider and negative terminals are connected to the *b*′–5 and *b*′–3 conductors respectively, the position of the potentiometer slider determining the time interval.

As in the case of the reader-sender signal unit A, two internal relays (not shown) are adapted to switch the punch-receiver signal unit from the transmit to the receive condition, the negative side of the receive and transmit relay coils being connected to the *t*′–4 and the *t*′–5 conductors, respectively, so that the transfer of the 199–1 contact (Fig. 17) changes the unit from a transmitter to a receiver. Actuation of the internal relays in this manner transfers the plate electrodes of the code thyratrons in the thyratron bank from an internal voltage source to the *a*′ conductors leading to the signal analyzer B′. At the same time, the second grids of the thyratrons are disconnected from the conductors 9, 10, 11, 12 and 13 in the *t*′ cable and are internally adapted to receive signals from the lines *a*. The *t*′–8 and *t*′–14 conductors control the signal unit receive switch as described above with respect to the reader signal unit, while the conductors *t*′–2 and *t*′–3 carry pulses for key trigger actuation and electronic ring start respectively.

In the *b*′ cable, the thyratron reset signal is applied to the *b*′–2 conductor at the end of the electronic ring cycle, while the *b*′–4 conductor supplies a synchronizing pulse at the beginning of each ring cycle and code analyze relay 107 in the control unit C′ is actuated through *b*′–6 after the five code thyratrons have been pulsed by the ring in the signal unit. Also included in the signal unit is a delay unit which prevents application of the forty volt positive potential to all the punch-receiver terminals until the electronic components have had sufficient time to warm up.

*Punch unit*

In order to punch a duplicate of the transmitted message into a tape at the receiving station, a paper tape punch unit P′ of the type described in detail in United States Patent No. 2,540,027, and adapted for automatic error deletion in the manner described in United States application Serial No. 556,643, filed December 30, 1955 now Patent No. 2,901,041, issued August 25, 1959, is utilized. Included in the punch unit but not illustrated herein are a drive motor; a clutch magnet to which positive voltage may be applied through the conductor *d*′–12; a notch punch magnet arranged to be energized through the line *d*′–9, successful completion of its operation being signalled by internal connection of the conductors *d*′–10 and *d*′–15; a notch read magnet having its positive side connected to the *m*′–2 conductor, reverse and no-feed magnets connected to the *d*′–13 and *d*′–14 conductors, respectively; and first and second notch read contacts connected to the *d*′–6 and *d*′–7 conductors, respectively.

During the error deletion procedure described below, detection of the notch punched at the start of a record incorrectly duplicated is indicated by internal joining of the conductors *d*′–10 and *m*′–3. In order to reproduce perforations in the five tape channels, five punch magnets, one associated with each channel, are arranged to be energized through the conductors *d*′–1 through *d*′–5, respectively, by information signals received in the corresponding channel positions. To prevent operation when the tape is improperly positioned in the punch, an internal tape tension switch supplies a positive potential through the conductor *d*′–8 if the tape is in position. In order to check the error deletion operation, a group of internal contacts is connected in series to join the conductors *d*′–11 and *d*′–15 if all the channels in the tape have been perforated during the error deletion cycle.

Internally connected to the *o*′–1 through *o*′–5 conductors, respectively, are five contacts arranged to detect perforations which have been punched in the corresponding tape channels and transmit signals to the SAC comparer G′ when voltage is applied to the punch unit through the *m*′–1 conductor.

Figures 10, 15:
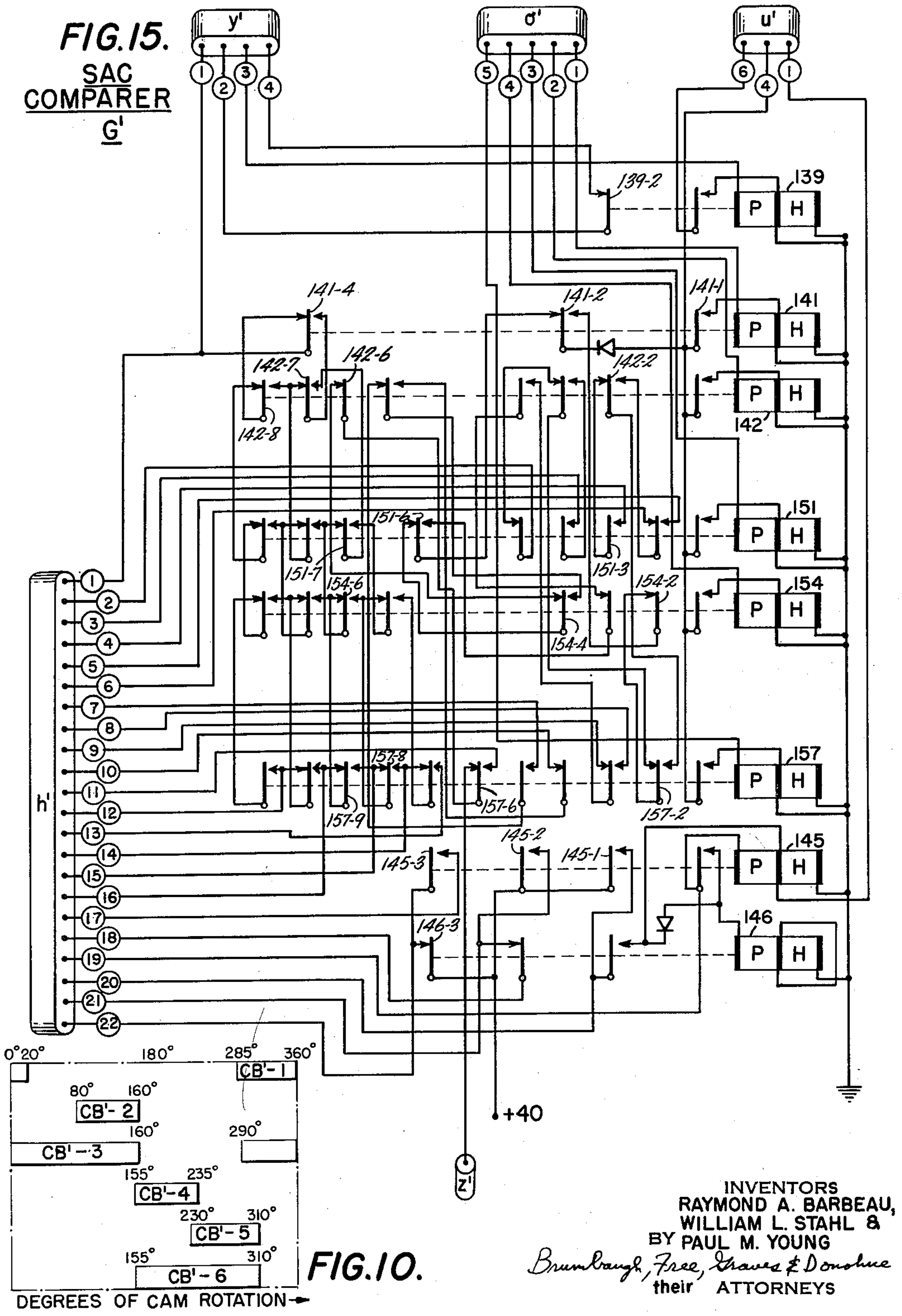
Fig. 10 is a chart illustrating the sequence of actuation of the circuit breakers in a timer associated with the punch unit.
Fig. 15 is a schematic diagram of a network for comparing the SAC total transmitted by the reader-sender with the SAC counter total.

A series of circuit breakers (not shown) is associated with the tape punch in the same manner as those associated with the tape reader A and each of these is adapted to close during a portion of each punch cycle according to the chart shown in Fig. 10, the CB′–1 through CB′–6 breakers being connected to the correspondingly numbered conductors in the *u*′ cable. While the CB′–2 through CB′–6 breakers apply a forty volt positive potential to the *u*′–2 through *u*′–6 conductors, the CB′–1 breaker connects the *u*′–1 conductor to ground and at the same time completes the circuits through the internal clutch, notch punch, and notch read magnets to ground.

*Signal analyzer and control unit*

When a code signal is received over the lines *a* from the reader-sender, it conditions the thyratron grids as described above, causing the appropriate thyratrons to conduct. The first pulse, being the synchronizing pulse, actuates the synchronize relay 101 (Fig. 11) through the *b*′–4 conductor and this relay normally remains actuated until the end of the record, a parallel resistor-capacitor loop 101*a* being arranged to energize the relay coil after each pulse until several milliseconds after the beginning of the next electronic ring cycle. When the synchronize relay is actuated, the conductors *b*′–5 and *b*′–3 are connected, through the contact 101–1, and the first grid of the non-sequence timing circuit thyratron 78 shown in Fig. 9 is maintained at a negative potential of 150 volts. If the synchronizing pulse of the next code signal is not received at the usual time, that is, within the time required for the loop 101a to release the relay 101, the 101–1 contact will open, permitting the thyratron first grid potential to increase at a rate dependent on the setting of the potentiometer 80. Restoration of the 101–4 normally closed contact completes a circuit from the eighty volt positive terminal to the thyratron plate through record relay contact 130–1 normally open, non-sequence relay 105, and the conductor *b′–1*. Unless another synchronize pulse is received within the predetermined interval, the thyratron will fire, actuating the non-sequence relay 105 to signal the error unit in the manner described below.

Receipt of the code pulses following each synchronizing pulse causes the appropriate code thyratrons in the signal unit thyratron bank to conduct. This actuates corresponding code relays 108, 109, 111, 112 and 114 in the signal analyzer B′ shown in Fig. 11 through the *a′* conductors, the eighty volt positive terminal being connected to the relays through a normally closed contact 104–1.

It will be remembered that the first code of each message unit is the FIGS code comprising information bits in the first, second, fourth and fifth channels. Receipt of this code, therefore, picks the relays 108, 109, 112, and 114, completing a circuit from the forty volt positive terminal through the contacts 107–3, 114–2, 109–4, 112–3, 108–3, all normally open, and contacts 111–3 and 127–5 normally closed, to pick first cycle relay 124, the analyze relay 107 being actuated through the conductor *b′–6* after receipt of the code pulses, closing the 107–3 contact.

Figure 12:
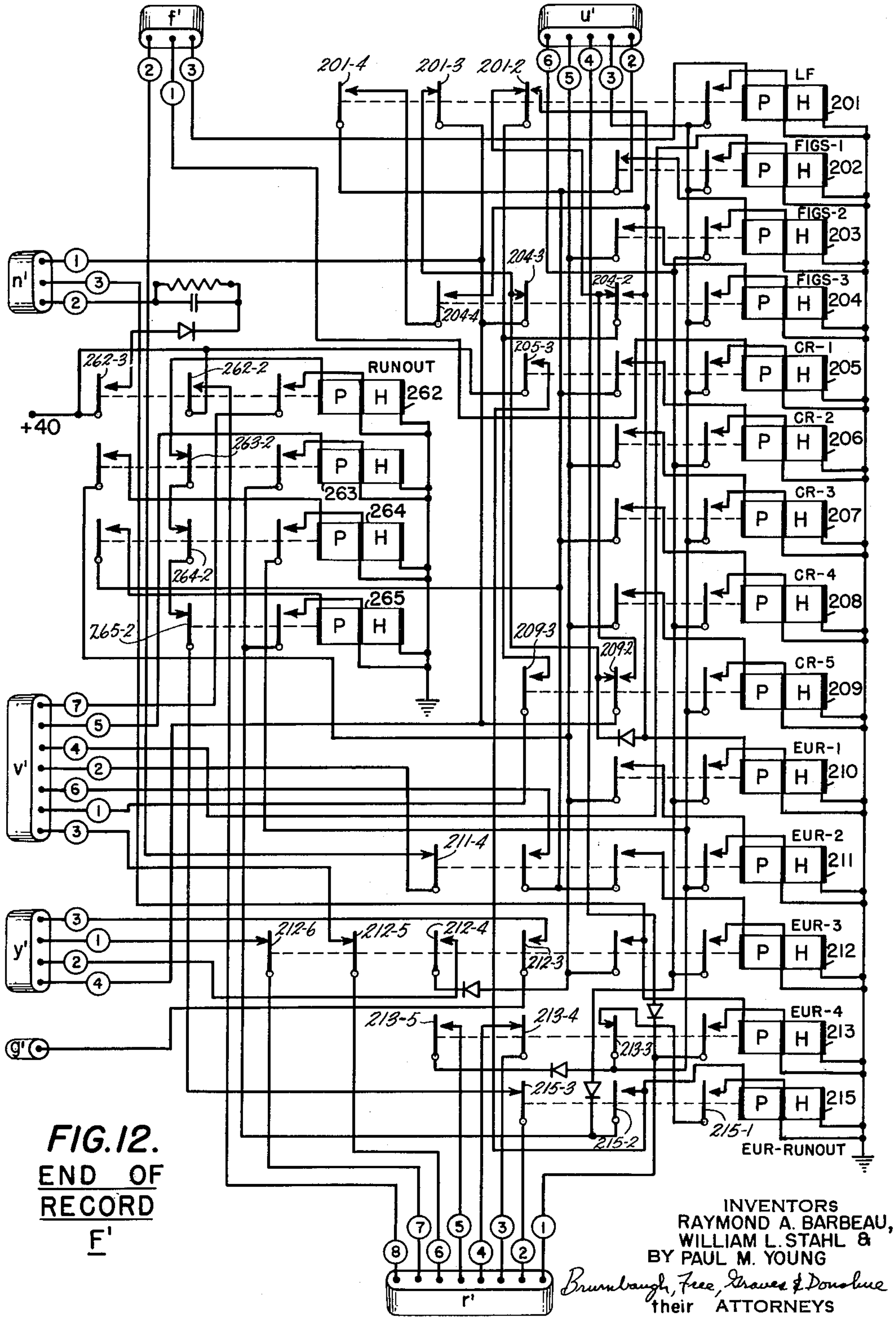
Fig. 12 is a schematic diagram of the end-of-record detector.
Figure 13:
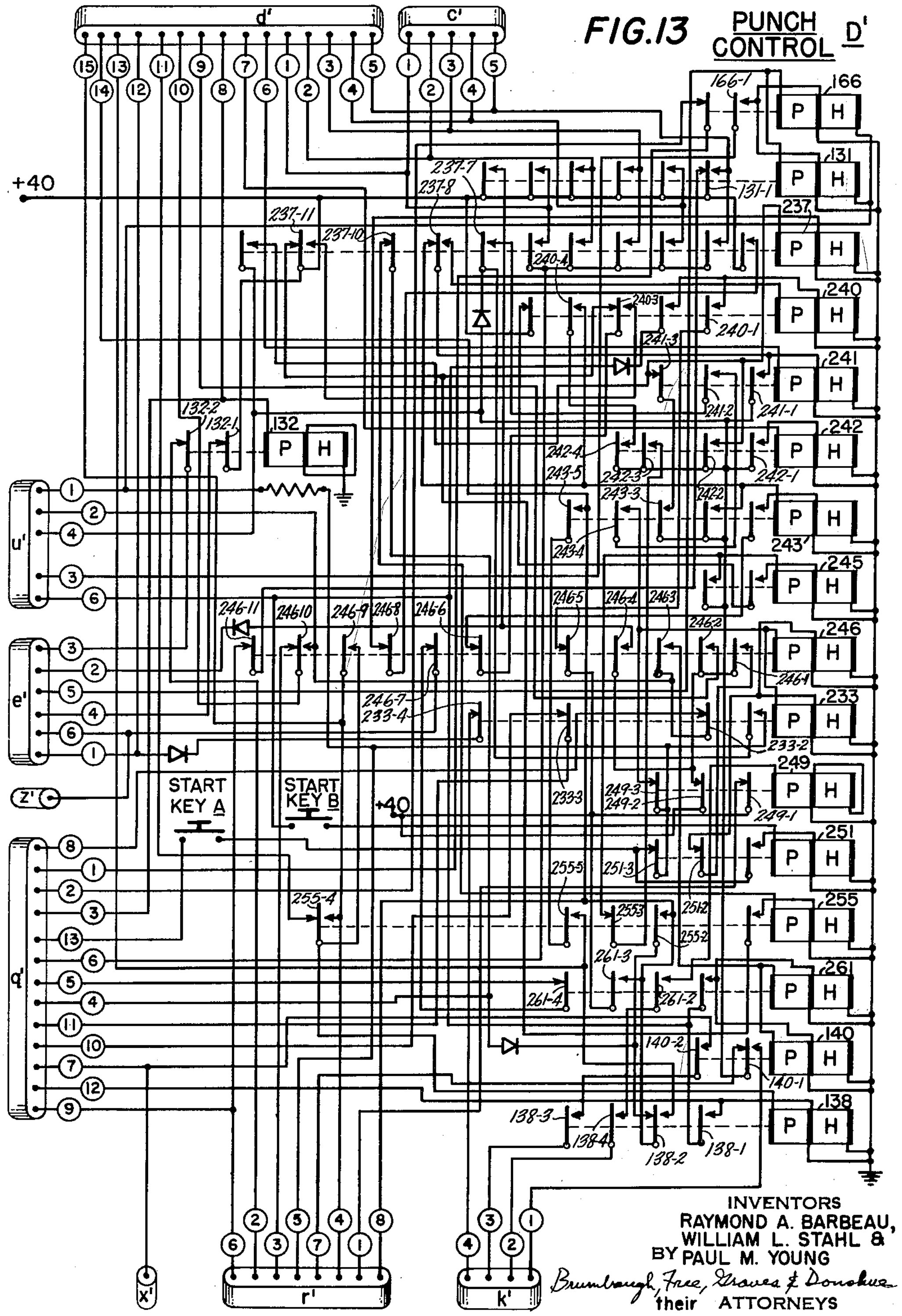
Fig. 13 is a schematic diagram of the punch control unit.
Figure 16:
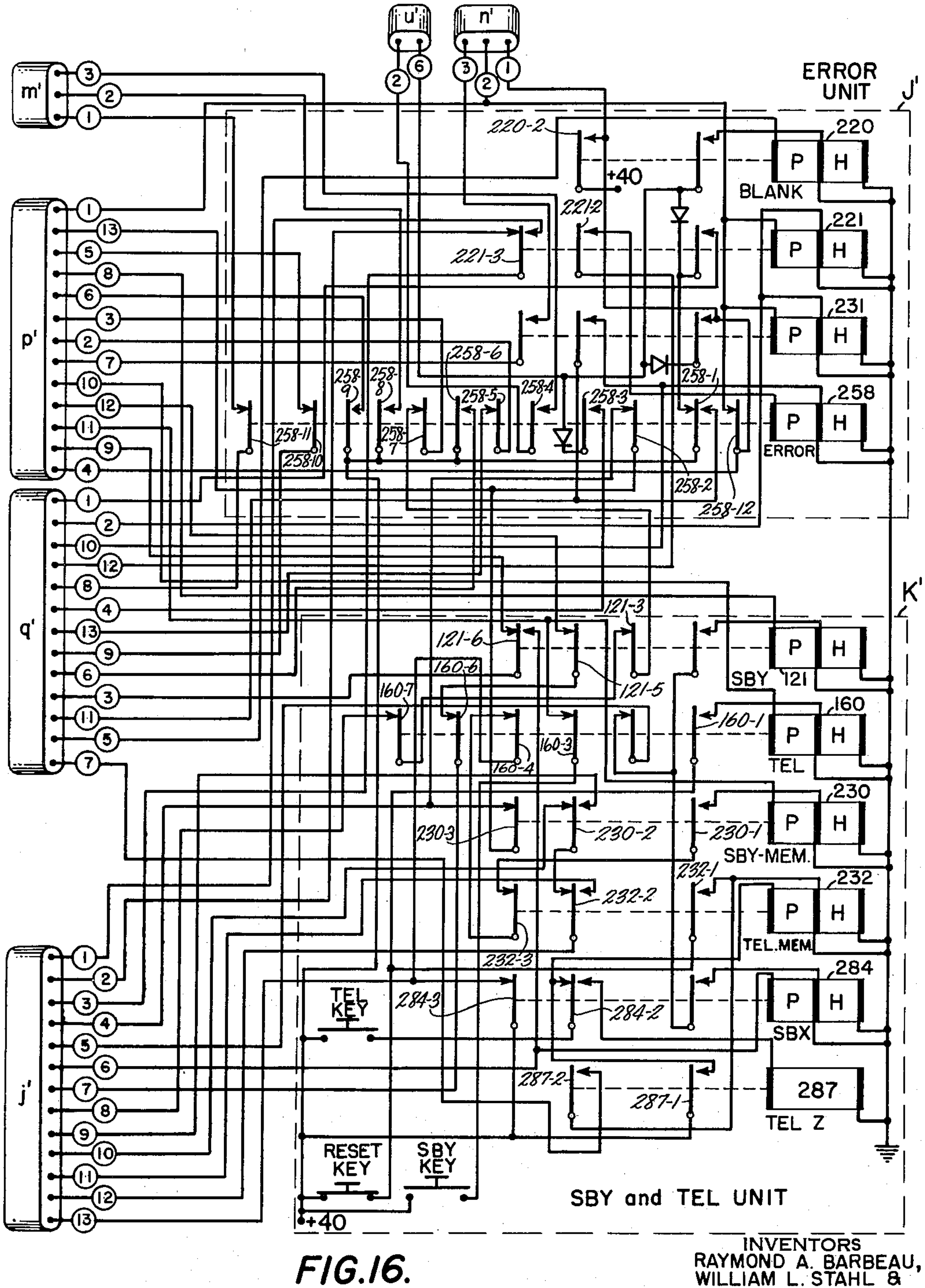
Fig. 16 is a schematic diagram of the networks of the error unit and the standby (SBY) and TEL unit.

Transfer of the 124–3 contact completes a circuit through the line *p′–5*, contact 258–10 in Fig. 16, the conductor *q′–9*, contacts 246–11 and 131–1 in Fig. 13, actuating record relay 127, the hold coil being energized through the contact 127–1, the line *v′–3*, contact 212–5 in Fig. 12, the conductor *r′–6* and the same circuit in Fig. 13. It will be noted that two other record relays 130 and 134 are also energized at the same time through the normally open contact 107–2 by the transfer of the 127–2 contact and these remain actuated until the 127 relay is restored. When the 127–4 contact transfers, clutch relay 126 is actuated through contacts 107–2 and 123–2 to energize the clutch magnet in the punch unit through the contact 126–1, the conductors *e′–1* and *d′–12*, punching the FIGS code into the tape, the clutch relay being held through the contact 126–1 until the breaker CB′–1 opens.

Meanwhile the FIGS code has been applied to transfer relays 115, 116, 119 and 120 through the contacts 108–5, 109–5, 112–5 and 114–5, and 127–7 and 107–1 normally open. A positive potential is now available through the *c′–1*, *c′–2*, *c′–4* and *c′–5* conductors through the contacts 115–2, 116–2, 119–2 and 120–2 and the corresponding *d′* conductors in Fig. 13 to energize the appropriate punch magnets, the transfer relays being held through the CB′–3 breaker cycle by the line *u′–3*. As described above, termination of the CB′–1 breaker cycle internally releases the punch magnets and the clutch magnet, while the clutch relay 126 is also restored, advancing the tape to the next position. Internal grounding of the *b′–2* conductor in the signal unit actuates thyratron reset relay 104 through the contact 104–3, releasing the code relays which were held through the 104–1 contact and breaking the circuit to the synchronize relay 101 and the analyze relay 107 through the contact 104–2.

Subsequent message codes are punched into the tape in the same manner, the record relays 127, 130 and 134 being held until the end-of-record code group is detected. It will be noted that a delay relay 133 is included in the control unit to prevent actuation of several of the punch-receiver circuits until the forty volt power is available from the signal unit. After the warm up period, the delay relay remains actuated until the power is turned off.

*End-of-record*

Figure 11:
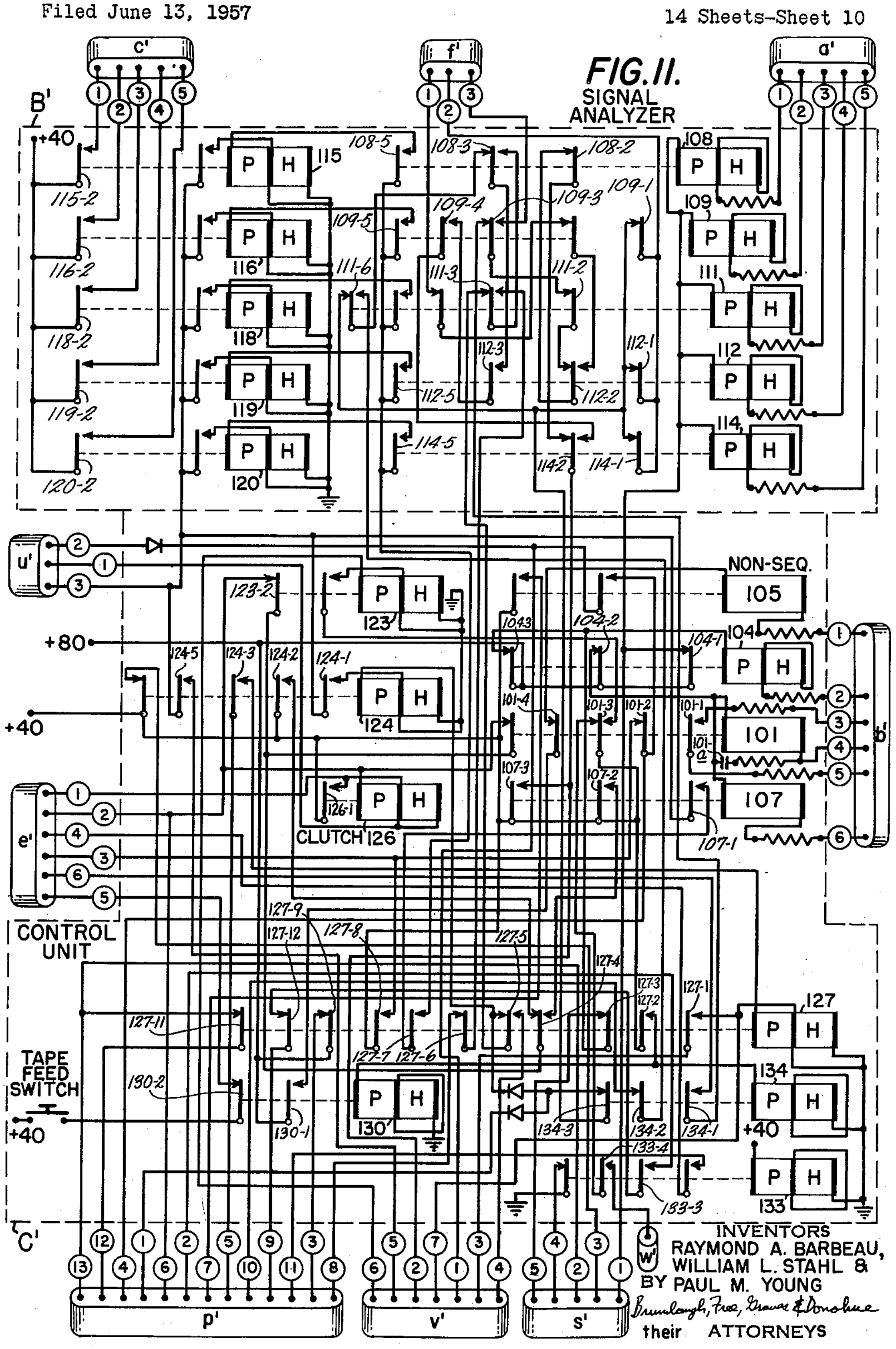
Fig. 11 is a schematic circuit diagram of the signal analyzer and control unit of the punch-receiver.

At the end of the message, the CR, FIGS, LF code group comprising pulses in the fourth; first, second, fourth, and fifth; and second code channels, respectively, is transmitted, completing circuits to the *f′–1*, *v′–4* and *f′–3* conductors, in sequence, as shown in Fig. 11. As illustrated in Fig. 12, CR–1 relay 205 is actuated through the conductor *f′–1* and the CR signal is carried through the next two circuit breaker cycles by relays 206, 207, 208 and 209 and the conductors *u′–2*, *u′–3*, *u′–5* and *u′–6* in the manner described above with respect to the relays in the reader control D. Similarly, the FIGS code actuates FS–1 relay 202, the signal being carried through one more cycle by relays 203 and 204 and in the third cycle the LF code actuates relay 201. Meanwhile these codes, along with the SAC number which follows, are punched into the tape in the usual manner.

Receipt of any two of the end-of-record codes in the proper order is sufficient to indicate the completion of the message record to the punch-receiver, stopping the tape motion and causing an edge notch to be punched. This is accomplished from the line *u′–2* through the contacts 201–4 and 204–4 or from the conductor *v′–1*, connected to the line *u′–2* in Fig. 11, through the contacts 209–3 and 204–2 or 201–2 to pick EUR–1 relay 210. The EUR signal is in turn held through another cycle by relays 211, 212 and 213 while the SAC number is received and punched in the tape. Transfer of the 212–3 contact then actuates the SAC check relay 139 (Fig. 15) from the *g′* conductor through the line *y′–3* if the two SAC numbers agree, the record relays 127, 130 and 134 being restored when the 212–5 contact opens. Actuation of the SAC check relay is sampled by the 212–4 contact and, if the 139–2 contact has not opened when the CB–5 breaker closes, an error is indicated and error memory relays 221 and 231 in Fig. 16 are picked through the conductors *y′–2*, *y′–4*, *n′–1* and contact 258–12. Otherwise, the check code CR will be transmitted as described below.

Within the punch unit the tape tension switch previously mentioned is arranged to operate in anticipation of the end of tape, leaving sufficient additional tape for at least six code characters. If the switch operates during the body of a message run-out relay 262 is picked through contacts 263–2, 264–2, 265–2, 215–3, the line *r′–2*, the contact 132–2 in Fig. 13, the line *e′–3* and the contact 127–8 in Fig. 11, energizing the no-feed magnet through the contact 262–3 and the line *r′–8* which is connected to the line *d′–14* in Fig. 13. This stops the tape motion and causes the remaining codes of the message to be over-punched at the same position in the tape. Meanwhile, the 262–3 contact actuates the error memory relays 221 and 231 through the conductor *n′–2* and at the end of the message record the tape is reversed and the message deleted by the error deletion operation described below. In order to make the run-out circuit compatible with the error deletion circuit, it is necessary to prevent actuation of the run-out relay 262 during the first two cycles of any record. This is accomplished by the first cycle 124–5 contact which actuates relay 263 (Fig. 12) from the *u′–3* conductor through the line *v′–5*, opening the 263–2 contact. Contacts 264–2 and 265–2 are held open in succession by the *u′–5*, *u′–3*, *u′–2* and *u′–6* conductors, energizing relays 264 and 265 during the next two cycles, after which the circuit is available to actuate the 262 relay.

If the tension switch operates after the start of an end-of-record code group, the message will be completed in the usual manner, sufficient tape remaining in the punch to record the end-of-record code group and the SAC number. When the CR-1 relay 205 is actuated, it energizes EUR run-out relay 215 through the contact 205–3, the 215–2 contact holding the pick coil for the duration of the conductor *u'*–6 cycle, and the contacts 215–1 and 213–3 energizing the hold coil through the conductor *u'*–3 cycle. It will be noted in Fig. 10 that the closed portions of the breakers CB'–3 and CB'–6 cycles overlap so that the EUR run-out relay 215 is thereby energized continuously until the end of the record is indicated by operation of the relay 213, opening the 213–3 contact. Transfer of the 215–3 contact in this manner prevents operation of the run-out relay 262 until the end of the record, thus permitting completion of the message being transmitted.

*SAC checking*

Figure 14:
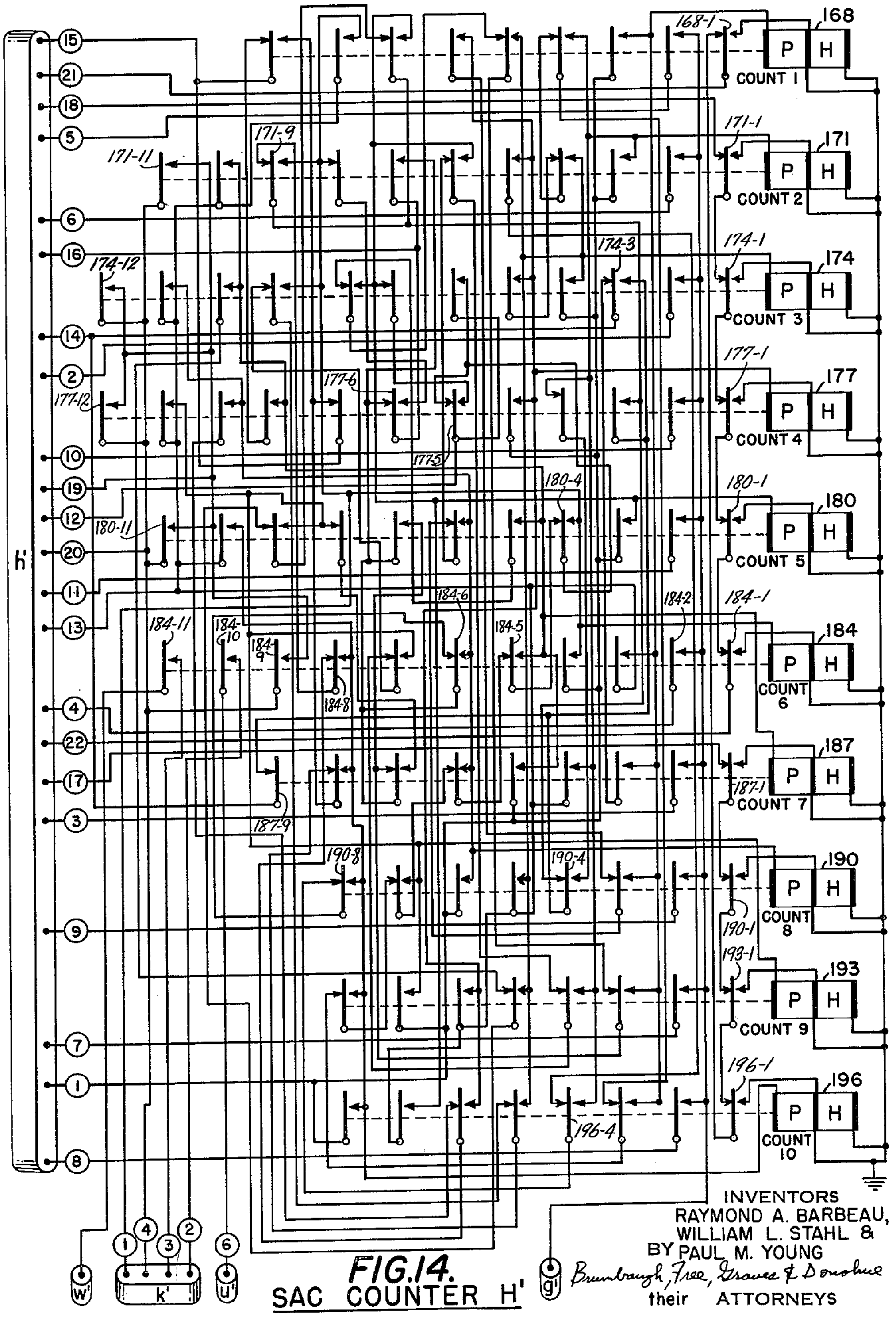
Fig. 14 is a schematic diagram of a counter network for the SAC system adapted to count the information bits recorded on the tape by the punch unit.

The system accuracy check utilized in the five channel tape transmission system of the present invention is similar in general but different in detail from that described in U.S. application Serial No. 553,001, filed December 14, 1955, and apparatus for carrying out the checking operation is schematically illustrated in Figs. 14 and 15. As the tape progresses through the punch, the presence of a perforation in any of the five code channels is internally detected as described above and indicated by a voltage signal applied to the correspondingly numbered conductors in the *o'* cable. As shown in Fig. 15, these signals energize appropriate ones of relays 141, 142, 151, 154 and 157 in the SAC comparer when power is applied to the *m'*–1 conductor through contact 258–11 in Fig. 16 from the line *q'*–8, contact 233–2 and the line *u'*–2 in Fig. 13. The number of perforations in each code column is detected by these relays and sent through the *h'* cable to the SAC counter, shown in Fig. 14, which accumulates the total perforations punched in the tape during any message and indicates the last digit of this number. An exception to this is the start of record FIGS code which comprises four perforations in the first, second, fourth, and fifth channels, energizing the 141, 142, 154 and 157 relays. Operation of counter reset relay 140 (Fig. 13) after a record separating notch has been punched in the tape resets the SAC counter to six, as described below, by energizing relay 184 from the conductor *u'*–4 through the contact 140–1 normally open and the line *k'*–1, the hold coil being energized through the contact 184–1, the line *h'*–22 and contact 146–3 of relay 146 (Fig. 10). The counter is reset to six in this manner after every record, before receipt of the next four-perforation FIGS code which then advances the counter to ten in preparation for the accumulation of the SAC number.

It will be noted that the hold coil of any one of the counter relays may be energized from the conductor *h'*–22 through the first contacts of all the other relays, the lines *h'*–18 and *h'*–21, and the contact 146–3. During each clutch cycle, power applied through the contact 126–1 (Fig. 11), the conductor *e'*–1, contact 233–4 in Fig. 13, the line *k'*–4 and contacts 171–11, 174–12, 177–12, 180–11 or 184–9, and *h'*–19 energizes relays 145 and 146 if any of the count 2, 3, 4, 5 and 6 relays was previously actuated. Transfer of the 146–3 contact restores any relay retained only by its hold coil and another hold circuit is established through the contact 145–2 and *h'*–21 until the counter total is higher than six, the *h'*–17 and *h'*–22 conductors being connected through the contact 145–3.

After the relay 140 is restored, detection of the FIGS code punched in the duplicate tape energizes the relays 141, 142, 154 and 157 in Fig. 15, completing a circuit through the contact 140–1 normally closed, the line *r'*–7, the contact 212–6 in Fig. 12, the conductor *y'*–1, the contact 141–4 normally open, 142–7 normally open, 151–7 normally closed, 154–6 normally open, 157–8 normally open, the line *h'*–14, contacts 187–9, 190–4 and 171–9, all normally closed, and the contact 184–8 normally open to pick count 10 relay 196, transfer of the contact 196–1 releasing the count 6 relay 184 and energizing the relay 196 hold coil. It will be observed that any combination of four perforations will apply power to the *h'*–14 conductor and that this condition will actuate a count relay four units higher than any one already energized in the SAC counter. Similarly, the *h'*–16 conductor is utilized when a two-perforation code is detected, the *y'*–1 conductor being connected thereto through the contacts 141–4 and 142–7 normally open and the contacts 151–7, 154–6 and 157–9 normally closed, for example. In the SAC counter, a relay two units higher will be energized thereby, such as count 2 relay 171 (Fig. 14) in the present case, through the conductor *h'*–16, contacts 177–6, 184–6 and 190–8, all normally closed and 196–4 normally open, the 196 relay being released and 171 being held through 171–1.

When the end-of-record relay 212 is actuated, the accumulated counter digit is compared with the SAC number which was transmitted by the reader-sender and punched into the tape. If, for example, the transmitted SAC number is six, the relays 141, 151 and 157 will be energized, the number six being represented by perforations in the first, third and fifth channels. This completes a circuit from the line *u'*–4 through the contacts 141–2 normally open, 154–2 normally closed, 157–2 normally open, 142–2 normally closed and 151–3 normally open to the *h'*–4 conductor. If the accumulated total is also six, as indicated by actuation of the count 6 relay 184, the SAC check relay 139 will be energized through the contact 184–2 normally open, the *g'* conductor, the contact 212–3 in Fig. 12, and the line *y'*–3, causing the check code CR to be transmitted as described hereinafter.

*Punch control*

As mentioned above, the punch-receiver initially retains control of the transmission system and, therefore, depression of start keys A and B, shown in the schematic diagram of the punch control D' in Fig. 13, is normally the first step in commencing transmission of a coded tape. This completes a circuit through the start key A from the *d'*–8 conductor, which supplies forty volts positive if the tape tension switch in the punch is closed, through the line *q'*–3, contact 121–6 normally closed in Fig. 16, the line *p'*–9, the contacts 127–12 and 133–3 in Fig. 11, the line *p'*–2, contact 258–5, the line *q'*–13, contacts 251–3 and 249–3 to pick notch relays 233 and 246, these relays being held through contacts 251–2, 246–1 and 249–2.

It will be noted that the tape tension switch also actuates tape relay 132 through the line *d'*–8, maintaining the 132–1 and 132–2 contacts in the open position as long as there is a supply of tape in the punch. When the notch relay 246 is picked, it energizes the notch punch magnet through contacts 249–2, 246–2 and the conductor *d'*–9, causing a notch to be punched in the edge of the tape. Meanwhile, the clutch relay 126 in Fig. 11 is energized through the contacts 249–2, 246–4, and the line *e'*–2, actuating the clutch magnet through the contact 126–1, the conductors *e'*–1 and *d'*–12, while a feed control relay 261 is picked through the contact 246–3 and the line *u'*–2, the 261–3 contact energizing the no-feed magnet through *d'*–14 so that the tape will not be moved during the notching cycle. At the same time, the counter reset relay 140 is picked, resetting the SAC counter (Fig. 14) to six as described above.

If the notch is successfully punched in the tape, as indicated by internal connection of the *d'*–10 and *d'*–15 conductors, a circuit is available from the *u'*–2 line through the contact 246–10 normally open, the *d'*–10 and *d'*–15 conductors and the 246–9 contact to actuate a code check relay 138, the hold coil being energized through the contact 138–1 and the $u'$–6 conductor. After the notch has been punched, operation of the start key B picks a start relay 251, releasing the notch relays 233 and 246 through the contacts 251–2 and 251–3. Transfer of the 138–3 contact completes the circuit from the contacts 101–3 normally closed and 133–4 in Fig. 11 through the conductor $w'$, the 184–11 contact in Fig. 14, the $k'$–3 conductor, the contacts 138–3 and 140–2 in Fig. 13, and the $x'$ conductor to pick a send relay 219 in Fig. 17. This transmits a check code (CR) to the reader-sender to start the next transmission, a CRT relay 222 being actuated through the 219–1 contact, the line $j'$–3, the contact 221–3 in Fig. 16, the conductor $j'$–2, a 282–1 contact, the $j'$–12 conductor, two contacts 232–2 and 230–2 and the line $j'$–10.

When the counter has been reset and the code check relay actuated, a circuit is available from the $u'$–6 line in Fig. 14 through the 184–10 contact, the conductor $k'$–2, and the contacts 138–4 and 261–2 (Fig. 13) to energize a stop relay 249 to stop the tape and await the arrival of the message codes from the reader-sender, also restoring the EUR–4 relay 213 through the contact 249–1 and the line $r'$–1. At the end of each message record, another edge notch is punched into the tape in the same manner through the conductor $u'$–3, the contact 213–5 (Fig. 12), the line $r'$–5 and the 249–3 contact.

*Error deletion*

If the SAC comparer indicates a non-check after the message has been punched into the tape, an error deletion operation, described in detail in U.S. application Serial No. 555,531, filed December 27, 1955, is put into effect. Detection of an error actuates the error memory relays 221 and 231 (Fig. 16) in the manner described below and transfer of the 221–3 contact picks two LFT relays 282 and 223 in Fig. 17 through the $j'$–1 line and the circuit described above with respect to the CRT relay to send the non-check (LF) code. When the code check relay 138 is energized by punching of the edge notch, transfer of the 138–1 contact completes a circuit from the $u'$–6 conductor through the $q'$–12 line and the contact 221–2 to energize an error relay 258, picking a clutch relay 126 through the contact 258–9 and the $p'$–6 line. The error relay remains energized in this manner until the end of the error deletion cycle. Transfer of the 258–8 contact operates the notch read magnet in the punch unit through the conductor $m'$–2 and closing of the 258–3 contact energizes a reverse relay 255 from the $u'$–6 line through the $q'$–4 conductor and the 237–10 contact and also actuates the reverse and no-feed magnets from the line $q'$–4 through the contact 255–2 and the $d'$–13 and $d'$–14 conductors respectively, these being connected through the contact 138–2 normally open. When the 258–4 contact closes, a circuit is completed from $u'$–2 to $m'$–3 and, if the notch has been successfully punched in the tape, the $m'$–3 conductor is internally connected to the $d'$–10 conductor. This picks the code check relay 138 through the contact 246–10 normally closed, the $r'$–3 line, the 213–4 contact in Fig. 12, the conductor $r'$–4 and the contact 255–4 normally open, the relay 138 remaining actuated in this manner to cause reverse transport of the tape when the clutch is energized through the 126–1 contact in Fig. 11, and the conductors $e'$–1 and $d'$–12. If no notch is detected, the reverse magnet is dropped through the contact 138–2 and the line $d'$–13 and another attempt to punch a notch is made at the same position in the tape.

After the tape has been moved backward in the punch, detection of the notch at the beginning of the incorrect record will be signalled by the two notch read contacts within the punch unit, a first notch read relay 241 being picked first through the $d'$–6 conductor and held through the 241–1 contact and the $u'$–4 line. When the tape has been reversed one more position, a second notch read relay 242 is picked through the $d'$–7 conductor and held through the contact 242–1 and the $u'$–4 line, a memory-1 relay 243 being energized through the contacts 241–1 and 237–8 normally closed. Thus a circuit is completed to actuate a forward relay 237 from the line $u'$–4 either through the 242–2 contact or through the contacts 243–3 and 241–3 after the 241 relay is restored. Actuation of the forward relay 237 restores the reverse relay 255 by transfer of the 237–10 contact, also deenergizing the reverse and no-feed magnets by opening of the 255–2 contact. Meanwhile, the notch read contacts again detect the beginning-of-record notch, this time in the reverse order, and actuation of the second notch read relay 242 picks a memory-2 relay 245 through the contacts 242–3 and 255–3. With this relay energized, actuation of the first notch read relay 241 by the first notch read contact causes a memory-3 relay 240 to be picked through the contacts 241–1 and 237–8 normally open, and held through the 240–1 and 246–5 contacts until the end of the error deletion operation.

With the error relay 258 actuated, the pick of the forward relay causes five perforations to be punched into the tape at each position as it advances, thus obliterating the incorrect message. This is accomplished through the contact 258–6 and the conductor $q'$–6, and the five 237 contacts connected to the $d'$–1 through $d'$–5 conductors. Restoring of the 255–4 contact connects the code check relay 138 to a series of five contacts within the punch unit through the conductor $d'$–11 and if all the deleting perforations have been properly made, power is available through the lines $u'$–6 and $r'$–3, the contact 213–4 in Fig. 12 and the lines $r'$–4 and $d'$–15 during each punch cycle to pick the code check relay 138.

Detection of the edge notch at the end of the incorrect record first actuates the second notch read relay 242 through the $d'$–7 line, thereby energizing the memory-1 relay 243 through the contacts 242–4 and 240–4. When the first notch read contact senses the notch, picking the relay 241 through the conductor $d'$–6, the notch relays 233 and 246 are actuated through the contacts 243–4, 241–2, and 237–7 and the conductor $u'$–4. Transfer of the 233–3 contact releases the error relay 258 through the lines $q'$–10 and $q'$–11 and the contact 258–1 normally open. Meanwhile, the memory-1 relay 243 is restored by opening of the 246–6 contact and the memory-3 relay 240 is dropped through the 246–5 contact, the forward relay 237 being released by the 246–8 contact. Closing of the 246–3 contact resets the SAC counter as described above by actuating the reset relay 140, and, after the notch has been repunched, the code check signal is transmitted as before and the punch-receiver awaits the retransmission of the message.

It will be remembered that the five-perforation LTRS code is a tape feed signal when it occurs out-of-record. Thus, a deleted record in a duplicated tape acts merely as a tape feed signal to advance the tape to the next message record when it is being read. In order to perforate the leader and trailer in each roll of tape in a similar manner, depression of a tape feed switch (Fig. 11) applies power through the 130–2 contact and the line $e'$–5 to two tape feed relays 131 and 166 in Fig. 13. These are held through the line $u'$–4 and the 166–1 contact during each punch cycle, power being applied to the $d'$–1 through $d'$–5 conductors by a series of 131 contacts to cause the punch unit to perforate all five channels at each position until the tape feed switch is released.

*Error unit*

The network comprising the error unit J' is adapted to detect any incorrect operation of the tape transmission system and to initiate the error deletion operation described above. Detection of an error, causing the error memory relays 221 and 231 in Fig. 16 to be picked, may be accomplished in any of several ways. For example, if the SAC check relay 139 is not actuated at the end of a record, as tested by the conductor $u'$–5, the contact 212–4 (Fig. 12) and the $y'$–2 line, a circuit is completed through the contact 139–2, the $y'$–4 and $n'$–1 conductors and the 258–12 contact to energize these relays. If a blank occurs in the punched tape, none of the relays 141, 142, 151, 154, and 157 will be energized through the $o'$ cable, and this will be detected in Fig. 15 by the contacts 141–2, 151–6, 154–4, 142–6 and 157–6, all normally closed, which complete a circuit from the conductor $u'$–4 through the $z'$ conductor to actuate a blank relay 220 through the contacts 246–7 and 261–4 in Fig. 13 and the $q'$–5 line. Similarly, receipt of a blank code from the reader will actuate the blank relay through the contact 107–3 normally open in Fig. 11, the contacts 114–2, 108–2, 112–2, 111–2 and 109–3 all normally closed, the 134–1 contact, the conductor $e'$–6, and the $z'$ conductor in Fig. 13, the record relay 134 being energized. Either of these conditions picks the error memory relays through the 220–2 and 258–12 contacts.

Likewise, a defective end-of-record code group energizes the relays 221 and 231 to initiate the error deletion operation. For example, if the CR code is received but neither the FIGS code nor the LF code has been detected after two more cycles, a circuit is available to the error memory relays from the $u'$–2 line in Fig. 11 through the conductor $v'$–1, the contact 209–3 normally open, either of the contacts 201–2 or 204–2 normally closed, the 209–2 contact normally open, the $n'$–1 conductor and the 258–12 contact in Fig. 16. Another condition initiating error deletion is the receipt of an unanalyzable code out-of-record, causing a "bad start." Normally, the only codes received out-of-record are SBY (information bits in all five channels), TEL (information bits in the second, third, fourth and fifth channels), and FIGS (information bits in the first, second, fourth and fifth channels), the latter being the beginning-of-record code. If a code received out-of-record does not include information in each of the second, fourth and fifth channels, this will be detected by one of the contacts 109–1, 112–1 and 114–1 in Fig. 11, completing the circuit from the contact 107–3 through the line $v'$–2, contact 211–4 in Fig. 12, the line $f'$–2, one of the contacts 109–1, 112–1, and 114–1, and contact 134–3 in Fig. 11, and the $p'$–1 conductor to pick the relays 221 and 231. Also, if information is received in all these three channels but neither the first nor the third channel has an information bit in the same code signal, a circuit is available through the contacts 111–6 normally closed and 108–3 normally closed, and the contacts 112–3, 109–4 and 114–2, all normally open, to actuate the error memory relays through the same circuit.

As mentioned above, the pick of the run-out relay 262 (Fig. 12) actuates the error memory relay through the contact 262–3 and the line $n'$–2. Also, the restoring of the synchronize relay 101 during a record by failure to receive the next code signal within a predetermined time picks the error memory relay through contacts 127–8, 101–2, the conductor $p'$–4 and the contact 258–12. After an incorrect operation has been detected in this manner, the error deletion procedure is carried out as described above under the control of the error relay 258.

*Standby and TEL units*

Either the standby or the TEL code may be sent from the punch-receiver by depression of a SBY key or a TEL key shown in the SBY and TEL unit K', in Fig. 16. The operation of this network is essentially the same as that described above in connection with the reader-sender, an SBY memory relay 230 being energized through a contact 160–3 when the SBY key is closed, and held through the contacts 230–1, 232–3, 160–4 and 284–3. Under the proper conditions, that is, when the system is not already in the SBY or the TEL condition or in error deletion, the SBY code will be transmitted when the punch-receiver goes out of record by actuation of an SBYT relay 224 in the transmit unit (Fig. 17). This takes place through the contact 219–1, the line $j'$–3, the contact 221–3 normally closed, conductor $j'$–2, contact 282–1, the line $j'$–12, the contacts 232–2 normally closed and 230–2 normally open, and the $j'$–9 line, the send relay 219 being energized on completion of the notch punch operation through the $x'$ line, the contacts 140–2 and 138–2, the $k'$–3 conductor, contact 184–11, line $w'$, and the contacts 133–4 and 101–3 as described above.

Operation of the TEL key actuates a TEL-MEM relay 232 through the contact 284–2 normally closed, and the TEL code is transmitted when a TELT relay 227 in Fig. 17 is energized through the line $j'$–11, contact 232–2 normally open, the $j'$–12 conductor and the circuit described above with respect to the standby code.

Receipt of a standby signal is detected by the code relays, contact 127–6 normally closed, and the conductor $p'$–8 to energize an SBY relay 121, putting the punch-receiver in the standby condition. Similarly, a TEL code received from the reader-sender actuates a TEL relay 160 through the contact 134–2 and the conductor $p'$–10, the relay 160 being held through the 160–1 contact until the reset key is operated. If the TEL key is closed while the SBY code is being transmitted, a TELZ relay 287 is actuated through the contact 284–2 causing the TEL-MEM relay 232 to be energized through the 287–1 contact, an SBX relay 284 being actuated through the line $j'$–6 by the operation of the SBYT relay.

*Transmit unit*

Transmission of operational codes from the punch-receiver is accomplished by the transmit unit illustrated in Fig. 17, wherein the send relay 219, actuated through the conductor $x'$ as described above, conditions the signal unit to transmit by connecting the $t'$–8 and $t'$–14 conductors through the contacts 199–4 and 219–4. When the SBY or TEL code is to be transmitted, a key trigger relay 125 is energized through the contacts 224–2 or 227–3 and 219–3. If the CR or LF code is to be sent, actuation of the key trigger relay takes place through the contacts 222–2 or 223–2, 219–2 and 219–3. Transfer of the 125–4 contact initiates the electronic ring operation through the contact 104–1 in Fig. 11, the $s'$–1 conductor, contact 125–4 and the $t'$–3 conductor, the relay 125 being held through the 125–1 and 103–2 contacts until a key trigger–2 relay 103 is energized through the contacts 104–3 and 127–3, the line $s'$–5 and a negative pulse received from the signal unit through the $t'$–2 line at the end of the signal transmission.

When the 125–3 contact closes, a relay 199 is energized, switching the signal unit from a transmitter to a receiver through the contact 199–1 normally open and the $t'$–4 conductor to await a response from the reader-sender, the conductors $t'$–6 and $t'$–7 being joined by the contact 199–2 to set the repeat timer in the signal unit. If a CR or LF code is transmitted, positive voltage is applied after the key trigger relay 125 is restored through a repeat relay 106 and the $t'$–1 conductor to the plate electrode of the thyratron 78, shown in Fig. 9, through the contacts 125–2, 227–2, 222–3 or 223–3 and 224–3, the line $j'$–8, the contacts 160–7, 121–3 and 258–7, conductor $p'$–3 and the contact 127–9 in Fig. 11. Restoring of the 125–3 contact releases the relay 199, disconnecting the $t'$–6 and $t'$–7 conductors which were joined by the 199–2 contact. This causes an increase in the thyratron grid voltage by dissipation of the charge stored in the condenser 83 and, if no signal is received from the reader-sender within a given time as determined by the setting of the potentiometer 80, the thyratron will conduct, actuating the repeat relay 106 and reenergizing the key trigger 125 through the contact 106–1 to start a repeat transmission of the code. Opening of the 125–2 contact drops the repeat relay while the 125–3 contact again actuates the relay 199, resetting the timing circuit.

It will be remembered that the t'–9, t'–10, t'–11, t'–12 and t'–13 conductors are connected to the second grids of the five code thyratrons in the signal unit when the punch-receiver is conditioned to transmit. Consequently, actuation of the CRT relay 222 conditions the fourth thyratron to conduct through contact 222–4 and the t'–12 conductor transmitting the CR code. Similarly the LFT relay 223 conditions the second thyratron through the contact 223–4 and the conductor t'–10, the SBYT relay 224 conditioning all five thyratrons and the TELT relay 227 conditioning the second, third, fourth and fifth thyratrons in a similar manner. Ordinarily, the relays 222 and 223 are held, until the punch is in record or an error is detected, through the contacts 222–1 and 223–1 respectively, conductor j'–4, contact 230–3 or 258–2 in Fig. 16, the line p'–13, contact 127–11 in Fig. 11, the p'–12 conductor, the contacts 121–5 and 160–6, the line j'–7, and the contacts 227–9 and 224–10. Transmission or receipt of the SBY or TEL code, however, will restore the CRT and LFT relays by transfer of the contacts 224–10, 227–9 and 160–6 or 121–5. Inasmuch as no response is elicited from the reader-sender, the SBY and TEL codes are not repeated in the above manner, the relays 224 and 227 being held through the contacts 224–1 and 227–1 only until the 125–3 contact opens.

Although the invention has been described with reference to a preferred embodiment, it will be understood that many modifications and changes therein will occur to those skilled in the art without departing from the spirit of the invention. Accordingly, the scope of the invention is not intended to be limited except as defined by the following claims.

We claim:

1. Apparatus for transmitting an information message record from a first station to a second station to produce a duplicate message record at the second station comprising means at the first station to read an original record and transmit signals representing the recorded information, means at the second station to receive the information signals, recording means responsive to said information signals to produce a duplicate record in accordance therewith, a counter arranged to accumulate a number representing the number of information bits in a duplicate message record, a comparer to compare the number of information bits counted by the counter at the second station with the number of information bits in the message in the original record, error detection means responsive to operation of the comparer indicating disagreement of the numbers compared, and message deleting means actuated by the error detection means for deleting an incorrectly reproduced message.

2. Apparatus according to claim 1 including a non-sequence timer associated with the means for receiving information signals adapted to energize the error detection means when a predetermined time interval elapses between the receipt of successive signals from the first station.

3. Apparatus according to claim 1 including a first standby network associated with the first station and a second standby network associated with the second station adapted to prevent the operation of the means for reading the original record and the recording means, respectively, when energized.

4. Apparatus according to claim 3 including a memory device associated with each of the standby networks adapted to postpone operation of the standby networks when a message is being transmitted until the message transmission is completed.

5. Apparatus according to claim 3 including a switch associated with the means for reading the original record adapted to detect deleted portions in the original record and to transmit a signal energizing the second station standby network to prevent duplication of the deleted portions.

6. Apparatus according to claim 3 including an alternate communication signal network operable from either the first station or the second station and adapted to energize the standby networks and cause a certain code to be transmitted to the other station.

7. Apparatus according to claim 6 including a memory device associated with the alternate communication signal network adapted to postpone the operation of the network when a message is being transmitted until the end of the message.

8. Apparatus for duplicating a coded information tape record wherein each information character comprises a column of parallel information bits and the tape record is separated into message units by the presence of certain operational codes at the beginning and end of each message unit and each message unit is followed by a code character representing the number of information bits contained in the message comprising a tape reader arranged to detect the coded information in the original tape column by column, a transmitter responsive to the information bits detected by the tape reader adapted to transmit corresponding information signals, a receiver adapted to receive the information signals from the transmitter, a plurality of transmitter information storage devices adapted to be conditioned by signals from the tape reader and from the receiver, a plurality of sequentially operable actuating devices arranged to convert parallel information stored in the storage devices into sequential information, a plurality of receiver information storage devices responsive to the signals received by the receiver arranged to store the sequentially received information in parallel, a punch unit for producing a duplicate tape arranged to punch information characters into a tape column by column according to the information bits stored in the plurality of receiver storage devices, a counter arranged to accumulate a number representing the total number of information bits punched into the tape in each message unit, a comparer for comparing the number of information bits in each message unit punched into the duplicate tape with the number present in the original tape message unit as represented by the code character following each message unit, error detection means responsive to operation of the comparer indicating disagreement of the numbers compared, and message deleting means responsive to the error detection means for deleting an incorrectly reproduced message.

9. Apparatus according to claim 8 including a non-sequence timer associated with the receiver adapted to energize the error detection means when a predetermined time interval elapses between the receipt of successive code characters from the transmitter.

10. Apparatus according to claim 8 including a first standby network associated with the tape reader and a second standby network associated with the tape punch adapted to prevent operation of the reader and the punch, respectively, when energized.

11. Apparatus according to claim 10 including a memory device associated with each of the standby networks adapted to postpone operation of the standby networks when a message is being transmitted until the end of the message.

12. Apparatus according to claim 10 including a switch associated with the tape reader adapted to detect deleted portions of the original tape and to transmit a signal energizing the tape punch standby network to prevent duplication of the deleted portions.

13. Apparatus according to claim 8 including a run-out switch associated with the punch unit adapted to stop the tape motion when the supply of tape in the punch is low and to energize the error detection means to delete the recorded portion of the message at the end of the message unit, and a run-out counter responsive to a code signal indicating the approach of the message completion adapted to prevent the error deletion operation normally initiated by the run-out switch.

14. Apparatus according to claim 10 including an alternate communication signal network operable from either the tape reader station or the tape punch station adapted to energize the standby networks and transmit a certain operational code to the other station.

15. Apparatus according to claim 14 including a memory device associated with the alternate communication signal network adapted to postpone the operation of the network when a message is being transmitted until the end of the message.

16. Apparatus for duplicating a coded information tape record wherein each information character comprises a column of parallel information bits and the tape record is separated into message units by the presence of certain operational codes at the beginning and end of each message unit and each message unit is followed by a code character representing the number of information bits contained in the message comprising a tape reader arranged to detect the coded information in the original tape column by column, a transmitter responsive to the information bits detected by the tape reader adapted to transmit corresponding information signals in sequence, a receiver adapted to receive the information signals from the transmitter, a plurality of transmitter information storage devices adapted to be conditioned by signals from the tape reader and from the receiver, a plurality of sequentially operable actuating devices arranged to convert parallel information stored in the storage devices into sequential information, a code analyzing network associated with the transmitter storage devices for detecting certain operational codes adapted to control the tape reader, a plurality of receiver information storage devices responsive to the signals received by the receiver arranged to store the sequentially received information in parallel, a code analyzing network associated with the receiver storage devices for analyzing certain operational codes adapted to control the tape punch, means for transmitting certain operational codes from the receiver storage devices to the transmitter storage devices, a punch unit for producing a duplicate tape arranged to punch information characters into a tape column by column according to the information bits stored in the plurality of receiver storage devices, a counter arranged to detect the perforations punched in the duplicate tape and adapted to accumulate a number representing the total number of information bits punched into the tape in each message unit, a comparer for comparing the number of information bits in each message unit punched into the duplicate tape with the number present in the original tape message unit as indicated by the code character punched into the duplicate tape following the reproduced message unit, error detection means responsive to operation of the comparer indicating disagreement of the numbers compared, and message deleting means responsive to the error detection means for deleting an incorrectly reproduced message.

17. Apparatus according to claim 16 including a repeat timer associated with the receiver and arranged to cause repeat transmission of certain operational codes by the transmitting means associated therewith when no response is received from the transmitter within a predetermined time interval.

18. Apparatus according to claim 16 including a non-sequence timer associated with the receiver adapted to energize the error detection means when a predetermined time interval elapses between the receipt of successive code characters from the transmitter.

19. Apparatus according to claim 16 including an unanalyzable code network responsive to the actuation of the receiver storage devices adapted to energize the error detection network when an unanalyzable operational code is stored in the receiver storage devices.

20. Apparatus according to claim 16 including a first standby network associated with the tape reader and a second standby network associated with the tape punch adapted to prevent operation of the reader and the punch, respectively, when energized.

21. Apparatus according to claim 20 including a memory device associated with each of the standby networks adapted to postpone operation of the standby networks when a message is being transmitted until the end of the message.

22. Apparatus according to claim 20 including a switch associated with the tape reader adapted to detect deleted portions of the original tape and to transmit a signal energizing the tape punch standby network to prevent duplication of the deleted portions.

23. Apparatus according to claim 16 including a run-out switch associated with the punch unit adapted to stop the tape motion when the supply of tape in the punch is low and to energize the error detection means at the end of the message unit thereby initiating deletion of the recorded portion of the last message.

24. Apparatus according to claim 23 including a run-out counter responsive to a code signal indicating the approach of the message completion adapted to prevent the error deletion operation normally initiated by the run-out switch.

25. Apparatus according to claim 20 including an alternate communication signal network operable from either the tape reader station or the tape punch station adapted to energize the standby networks and transmit a certain operational code to the other station.

26. Apparatus according to claim 25 including a memory device associated with the alternate communication signal network adapted to postpone the operation of the network when a message is being transmitted until the end of the message.

References Cited in the file of this patent

UNITED STATES PATENTS

| | | |
|---|---|---|
| 1,972,326 | Angel | Sept. 4, 1934 |
| 2,281,745 | Buckingham | May 5, 1942 |
| 2,680,240 | Greenfield | June 1, 1954 |
| 2,682,573 | Hunt | June 29, 1954 |
| 2,689,950 | Bayliss et al. | Sept. 21, 1954 |
| 2,702,380 | Brustman et al. | Feb. 15, 1955 |
| 2,706,215 | Van Duuren | Apr. 12, 1955 |
| 2,730,700 | Serrell | Jan. 10, 1956 |
| 2,828,362 | Darwin et al. | Mar. 25, 1958 |
| 2,850,718 | Davison et al. | Sept. 2, 1958 |
| 2,854,653 | Lubkin | Sept. 30, 1958 |

FOREIGN PATENTS

| | | |
|---|---|---|
| 827,082 | Germany | Sept. 14, 1953 |
| 1,090,558 | France | Oct. 20, 1954 |